(12) United States Patent
Beirne et al.

(10) Patent No.: US 7,591,592 B2
(45) Date of Patent: *Sep. 22, 2009

(54) JOURNAL

(75) Inventors: Patrick Beirne, Mullingar (IE); Thomas Mullen, Navan (IE)

(73) Assignee: Menza Limited, Castlepollard, County Westmeath (IE)

( * ) Notice: Subject to any disclaimer, the term of this patent is extended or adjusted under 35 U.S.C. 154(b) by 406 days.

This patent is subject to a terminal disclaimer.

(21) Appl. No.: 11/186,862

(22) Filed: Jul. 22, 2005

(65) Prior Publication Data

US 2005/0254738 A1    Nov. 17, 2005

Related U.S. Application Data

(63) Continuation-in-part of application No. 10/216,571, filed on Aug. 12, 2002, now Pat. No. 6,938,964, and a continuation-in-part of application No. 10/216,244, filed on Aug. 12, 2002, now Pat. No. 6,910,742.

(60) Provisional application No. 60/590,370, filed on Jul. 23, 2004.

(51) Int. Cl.
  *F16C 32/02* (2006.01)
  *B60B 23/00* (2006.01)
  *B60B 27/02* (2006.01)

(52) U.S. Cl. ............... 384/295; 301/119; 301/111.01; 301/111.02

(58) Field of Classification Search ......... 384/295–296; 301/111.01, 111.02, 111.03, 111.07, 112, 301/118–122; 403/318, 355
See application file for complete search history.

(56) References Cited

U.S. PATENT DOCUMENTS

| | | | | |
|---|---|---|---|---|
| 289,627 A | * | 12/1883 | Crabtree | 301/120 |
| 486,023 A | * | 11/1892 | Bernel | 301/118 |
| 745,989 A | | 12/1903 | Ayres | |
| 760,169 A | * | 5/1904 | Abbott | 301/119 |
| 882,441 A | * | 3/1908 | Wilson | 301/119 |
| 2,424,757 A | * | 7/1947 | Klumpp, Jr. | 174/153 G |
| 3,720,294 A | * | 3/1973 | Plamper | 192/46 |
| 4,358,162 A | | 11/1982 | Schneider et al. | 301/63 |
| 4,544,425 A | | 10/1985 | Provolo | 156/73 |
| 4,641,878 A | | 2/1987 | Petersson | 295/49 |

(Continued)

FOREIGN PATENT DOCUMENTS

EP    0083451    7/1983

(Continued)

*Primary Examiner*—Marcus Charles
(74) *Attorney, Agent, or Firm*—Jacobson Holman PLLC

(57) ABSTRACT

A journal for coupling a wheel to an axle includes a main body portion and a separate locking element mounted to the main body portion. The locking element includes a locking arm and an integral resilient leaf spring. The locking element is pivotable about a pivot axis A-A extending through a pair of pivot extensions between a release position and a secured position. In the release position, the axle is movable into and out of a reception space within the main body portion. In this release position, the leaf spring bears against the main body portion to bias the locking arm towards the secured position. In the secured position, the locking arm engages with a groove in the axle to secure the axle in position in the reception space.

22 Claims, 37 Drawing Sheets

U.S. PATENT DOCUMENTS

| | | | |
|---|---|---|---|
| 5,090,778 A | 2/1992 | Laudszun et al. | 301/105 |
| 5,314,241 A | 5/1994 | Cheng | 301/111 |
| D352,687 S | 11/1994 | Markling | D12/204 |
| 5,368,371 A | 11/1994 | Markling | 301/64 |
| 5,408,854 A | 4/1995 | Chiu | 70/225 |
| 5,529,385 A | 6/1996 | Tsao | 301/111 |
| 5,884,982 A | 3/1999 | Yemini | 301/111 |
| 5,902,018 A | 5/1999 | Owen et al. | 301/111 |
| 6,056,369 A | 5/2000 | Lin | 301/111 |
| 6,099,083 A | 8/2000 | Logan | 301/111 |
| 6,170,920 B1 | 1/2001 | Markling | 301/111 |
| 6,234,582 B1 | 5/2001 | Wu | 301/111 |
| 6,273,520 B1 | 8/2001 | Liao | 301/111 |
| 6,280,001 B1 | 8/2001 | Parker et al. | 301/112 |
| 6,361,121 B1 | 3/2002 | Morris | 301/112 |
| 6,375,274 B1 | 4/2002 | Morris | 301/111 |
| 6,464,305 B2 | 10/2002 | Markling | 301/111 |
| 6,520,597 B1 | 2/2003 | Markling | 301/64 |
| 6,523,910 B1 | 2/2003 | Lin | 301/111 |
| 6,530,692 B2 * | 3/2003 | Wyer | 384/295 |
| 6,561,593 B2 * | 5/2003 | Godwin | 301/111.04 |
| 6,637,835 B2 | 10/2003 | Morris | 301/111 |
| 6,886,893 B1 | 5/2005 | Fisch et al. | 301/111 |
| 6,896,335 B2 | 5/2005 | Markling | 301/64 |
| 6,910,742 B2 * | 6/2005 | Flood et al. | 301/111.01 |
| 6,913,324 B2 | 7/2005 | Markling | 301/111 |
| 2004/0070263 A1 | 4/2004 | Morris | 301/111 |
| 2004/0262984 A1 | 12/2004 | Morris | 301/111 |

FOREIGN PATENT DOCUMENTS

| | | |
|---|---|---|
| EP | 0359947 | 3/1990 |
| EP | 0508902 | 10/1992 |
| EP | 995870 A1 * | 4/2000 |
| JP | 04005482 A * | 1/1992 |
| JP | 07042778 A * | 2/1995 |
| WO | WO97/32799 | 9/1997 |

* cited by examiner

JOURNAL

RELATED APPLICATIONS

This is a complete application claiming benefit of provisional 60/590,370 filed Jul. 23, 2004, and a continuation-in-part application based upon application Ser. No. 10/216,571 filed 12 Aug. 2002 and entitled A Wheel, now U.S. Pat. No. 6,938,964, and application Ser. No. 10/216,244 filed 12 Aug. 2002 and entitled A Wheel, now U.S. Pat. No. 6,910,742.

INTRODUCTION

This invention relates to a journal suitable for coupling a wheel to an axle. In particular this invention relates to a journal suitable for use with blow moulded plastic wheels of the type often used with roll-out refuse bins, as typically used for street-side refuse collections. Such refuse bins are commonly referred to as "wheelie bins" or "trash carts".

Because of the heavy duty required of such bins it is essential that the bin wheels are securely coupled to an axle. Various attempts have been made to provide retaining systems for coupling a bin wheel to an axle.

This invention is aimed at providing an improved journal for coupling a wheel to an axle.

SUMMARY OF THE INVENTION

According to the invention there is provided a journal for coupling a wheel to an axle. The journal is configured to be mounted in a bore of a wheel. The journal defines a reception space for receiving at least part of an axle. The journal includes a main body portion; a locking element separate from the main body portion, the locking element being movable between a release position in which the axle is removable from the reception space and a secured position in which the axle is secured in position in the reception space; and a biasing element to bias the locking element towards the secured position; the biasing element being provided integral with the locking element.

In one embodiment of the invention the biasing element is of a plastics material.

The biasing element may comprise a resilient element. In one embodiment the resilient element comprises a leaf spring. The resilient element may be provided in the form of a substantially planar element. The planar element may comprise a tab.

The resilient element may be configured to bear against the main body portion to bias the locking element towards the secured position. The main body portion may comprise an upstanding shoulder against which the resilient element is configured to bear to bias the locking element towards the secured position.

In one case the locking element is pivotable about a pivot axis between the release position and the secured position. The pivot axis may be substantially parallel to a longitudinal axis of the reception space. The pivot axis may be radially offset from the longitudinal axis of the reception space. The pivot axis may extend through the region of the junction between the biasing element and the locking element.

In another embodiment the locking element is mounted to the main body portion. The locking element may comprise a pivot extension for location in a co-operating pivot receiver of the main body portion. The locking element may comprise a pair of oppositely directed pivot extensions for location in a pair of co-operating pivot receivers of the main body portion. The pivot extension may be locatable in the pivot receiver in a snap-fit manner.

In one case the locking element is shaped to resist movement of the locking element from the secured position to the release position upon retraction of an axle through the reception space.

The journal may comprise an accessway through which access may be gained to one or more movable parts of the journal. The accessway may be provided in the main body portion through which access may be gained to the locking element.

In one embodiment the locking element comprises an engagement formation to facilitate movement of the locking element between the secured position and the release position. The engagement formation may comprise a recess.

In another aspect of the invention there is provided a journal for coupling a wheel to an axle. The journal is configured to be mounted in a bore of a wheel. The journal defines a reception space for receiving at least part of an axle. The journal includes a main body portion; a locking element separate from the main body portion, the locking element being movable between a release position in which the axle is removable from the reception space and a secured position in which the axle is secured in position in the reception space; and a biasing element to bias the locking element towards the secured position; the biasing element being of a plastics material.

The invention also provides in a further aspect a journal for coupling a wheel to an axle. The journal is configured to be mounted in a bore of a wheel. The journal defines a reception space for receiving at least part of an axle. The journal includes a locking element movable between a release position in which the axle is removable from the reception space, and a secured position in which the locking element is engagable with the axle at a region of engagement to secure the axle in position in the reception space; the region of engagement being located substantially mid-way along the length of the bore, when the journal is mounted in the bore.

In one embodiment the reception space defines an insertion end through which the axle may enter the reception space, and a closed end opposite to the insertion end; the closed end of the reception space being configured for location externally of the bore, when at least part of the journal is mounted in the bore, to facilitate reception of the axle in the reception space with a leading end of the axle located externally of the bore.

The invention provides in another aspect a journal for coupling a wheel to an axle. The journal is configured to be mounted to a wheel with at least part of the journal in a bore of the wheel. The journal defines a reception space for receiving at least part of an axle. The reception space defines an insertion end through which the axle may enter the reception space, and a closed end opposite to the insertion end. The closed end of the reception space is configured for location externally of the bore, when at least part of the journal is mounted in the bore, to facilitate reception of the axle in the reception space with a leading end of the axle located externally of the bore. The journal includes a locking element movable between a release position in which the axle is removable from the reception space, and a secured position in which the locking element is engagable with the axle at a region of engagement within the bore to secure the axle in position in the reception space.

In one case at least part of the journal is substantially frusto-conically shaped at the closed end. A base region of the frusto-cone may be engagable with a shoulder defined on the wheel to retain the journal in position in the bore. An apex region of the frusto-cone may extend from the base region externally of the bore, when at least part of the journal is mounted in the bore.

The locking element may be configured to engage with the axle in a recess in the axle.

According to a further aspect, the invention provides a journal for coupling a wheel to an axle. The journal is configured to be mounted in a bore of a wheel. The journal defines a reception space for receiving at least part of an axle. The journal includes a main body portion; and a locking element movable between a release position in which the axle is removable from the reception space and a secured position in which the axle is secured in position in the reception space; the main body portion comprising an engagement surface against which at least part of the locking element is engagable to releasably lock the locking element in the secured position.

The locking element may be engagable against the engagement surface in a radially outward direction.

The engagement surface may be provided by a protruding part of the main body portion. The protruding part may be provided in the form of an overhang part. The reception space may define an insertion end through which an axle may enter the reception space, and the protruding part may protrude away from the insertion end.

In one case the locking element comprises a protrusion for engagement against the engagement surface. The reception space may define an insertion end through which an axle may enter the reception space, and the protrusion may be provided at the side of the locking element closest to the insertion end. The protrusion may protrude from the locking element towards the insertion end.

In one case the locking element comprises a locking part and an actuating part, the locking part being engagable against the engagement surface. The locking element may be pivotable about a pivot axis between the release position and the secured position, the locking part being provided on one side of the pivot axis and the actuating part being provided on the other side of the pivot axis.

In a further aspect of the invention, there is provided a journal for coupling a wheel to an axle. The journal is configured to be mounted in a bore of a wheel. The journal defines a reception space for receiving at least part of an axle. The reception space defines an insertion end through which at least part of the axle may enter the reception space, and a closed end opposite to the insertion end. The journal includes an upstanding stop formation at the closed end of the reception space against which the axle is engagable when at least part of the axle is fully inserted into the reception space.

In one embodiment the area of engagement between the stop formation and an axle is less than the total area of a leading end of the axle.

The journal may comprise a locking element movable between a release position in which an axle is removable from the reception space, and a secured position in which the locking element is engagable with the axle at a region of engagement to secure the axle in position in the reception space. The stop formation may upstand from the closed end of the reception space a distance sufficient to locate an axle, when at least part of the axle is fully inserted into the reception space, with the region of engagement aligned with the locking element.

The journal may comprise a main body portion, the locking element being separate from the main body portion. The main body portion may comprise the stop formation.

The invention also provides in a further aspect a journal for coupling a wheel to an axle. The journal is configured to be mounted in a bore of a wheel. The journal defines a reception space for receiving at least part of an axle. The journal includes a first portion for location within the bore adjacent a first end of the bore when the journal is mounted in the bore; a second portion for location within the bore further from the first end than the first portion when the journal is mounted in the bore, the second portion having a smaller outer diameter than the first portion around at least part of the circumference of the journal; a third portion for location within the bore further from the first end than the second portion when the journal is mounted in the bore, the third portion having a smaller outer diameter than the second portion around at least part of the circumference of the journal.

In one case the second portion has a smaller outer diameter than the first portion around only a part of the circumference of the journal. The second portion may have an outer diameter equal to the outer diameter of the first portion around part of the circumference of the journal.

The journal may comprise a fourth portion for location within a bore further from the first end than the third portion when the journal is mounted in the bore, the fourth portion having a smaller outer diameter than the third portion around at least part of the circumference of the journal.

In one case the journal comprises a fifth portion for location externally of a bore adjacent the first end when the journal is mounted in the bore, the fifth portion having a larger outer diameter than the first portion around at least part of the circumference of the journal.

In one embodiment the journal comprises a retainer to retain the journal in position in a bore. The retainer may comprise a recess in a sidewall of the journal for receiving a corresponding protruding part of the wall of a bore to retain the journal in position in the bore. The recess may extend through only part of the sidewall of the journal. The depth of the recess may be less than the thickness of the sidewall of the journal.

The retainer may comprise a lip engagable with a shoulder defined on a wheel. The lip may be engagable with a shoulder defined by an open mouth of a bore. The lip may be engagable with a shoulder defined within a bore. In one case the lip is engagable with a shoulder which extends circumferentially around a bore. The journal may comprise a lip at each end of the journal.

In a further embodiment the journal comprises an aligner to assist alignment of the journal when mounting in a bore. The aligner may comprise a part of the journal, which extends around only a portion of the circumference of the journal, shaped to mate with a corresponding part of a wheel, which extends around only a portion of the circumference of the wheel. The part of the journal may have a substantially flat shape, and the corresponding part of a wheel may have a substantially flat shape. The part of the journal may comprise a male element, and the corresponding part of a wheel may comprise a female element suitable for receiving the male element.

In one case the invention provides a wheel assembly comprising a wheel and a journal of the invention for coupling the wheel to an axle.

In another case the invention provides an axle assembly comprising an axle and a journal of the invention for coupling the axle to a wheel.

In a further case the invention provides an assembly of a wheel, an axle and a journal of the invention for coupling the wheel to the axle.

In a further aspect of the invention there is provided a wheel suitable for being coupled to an axle. The wheel has an outer rim and an inner hub which defines a central bore having a first end. The bore includes a first portion adjacent the first end; a second portion further from the first end than the first portion, the second portion having a smaller inner diameter than the first portion around at least part of the circumference of the bore; and a third portion further from the first end than the second portion, the third portion having a smaller inner diameter than the second portion around at least part of the circumference of the bore.

In one embodiment the second portion has a smaller inner diameter than the first portion around only a part of the circumference of the bore. The second portion may have an inner diameter equal to the inner diameter of the first portion around part of the circumference of the bore.

The wheel may comprise a fourth portion further from the first end than the third portion, the fourth portion having a smaller inner diameter than the third portion around at least part of the circumference of the bore.

In one case the invention provides a wheel assembly comprising a wheel of the invention, and a journal of the invention for coupling the wheel to an axle.

In another case the invention provides an assembly of a wheel of the invention, an axle and a journal of the invention for coupling the wheel to the axle.

BRIEF DESCRIPTION OF THE DRAWINGS

The invention will be more clearly understood from the following description of some embodiments thereof, given by way of example only, with reference to the accompanying drawings, in which.

DETAILED DESCRIPTION

Figure 1:
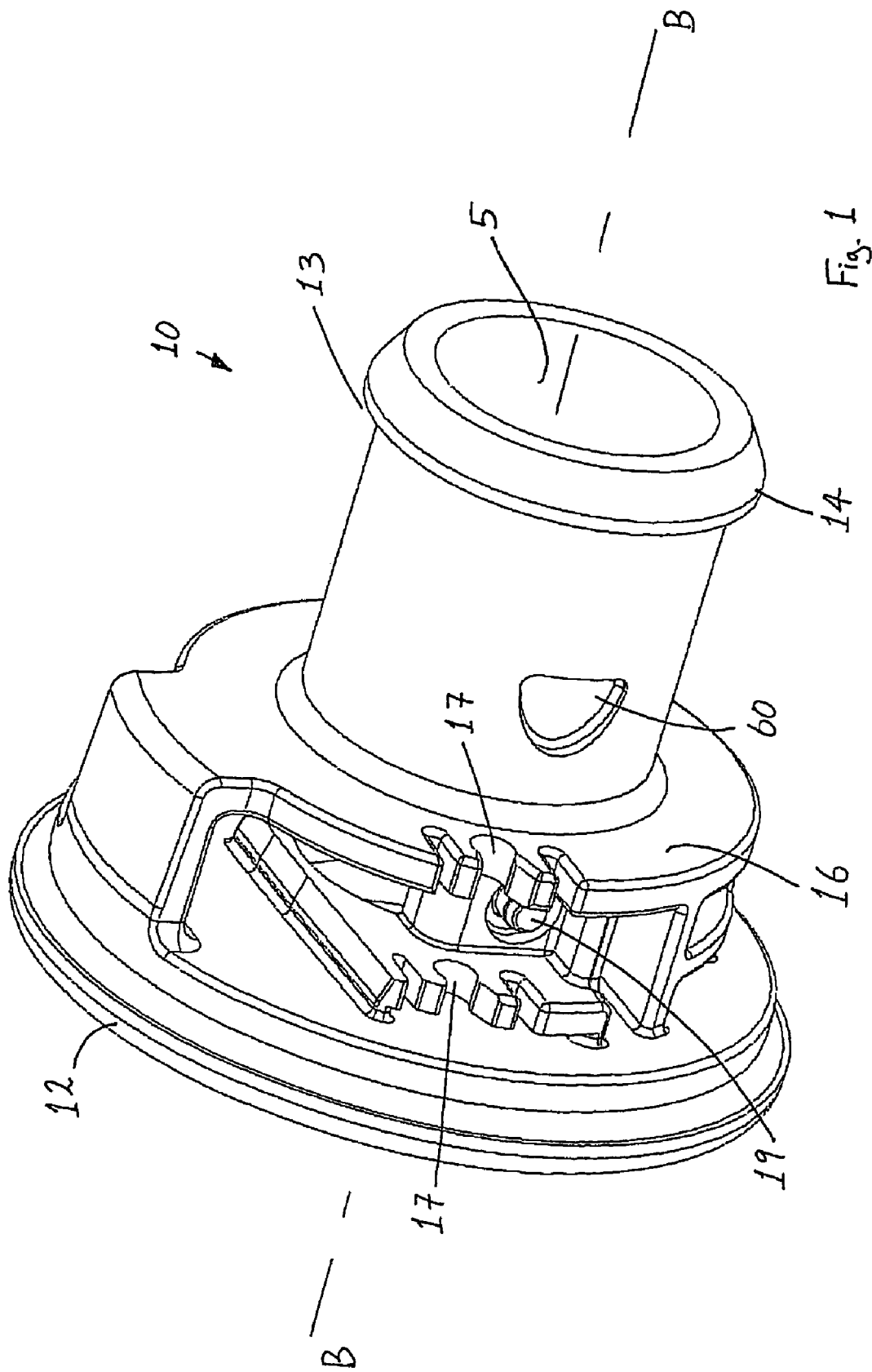
FIG. 1 is a perspective view of a part of a journal according to the invention.
Figure 2:
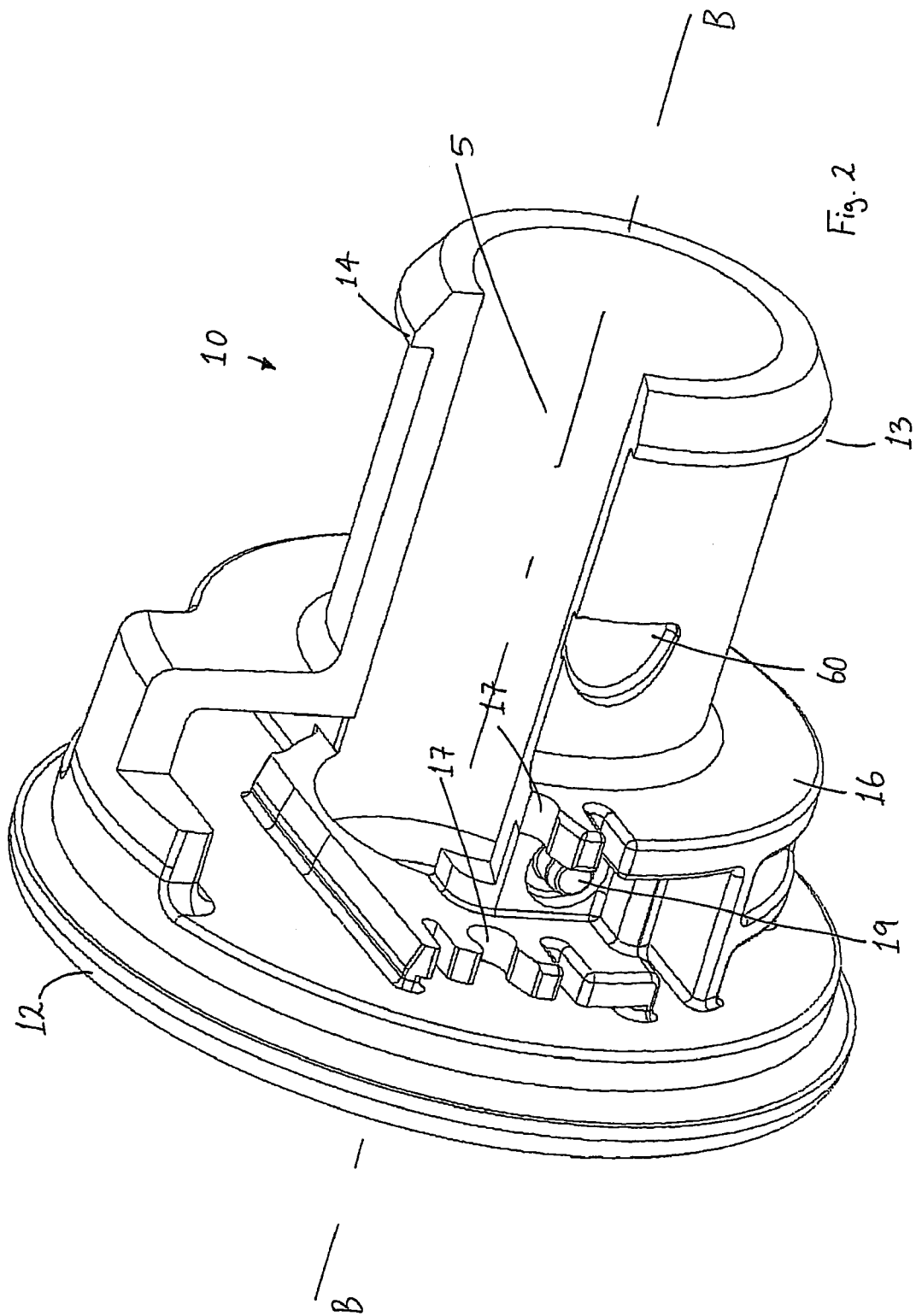
FIG. 2 is a partially cut-away, perspective view of the part of the journal of FIG. 1.

Referring to the drawings and initially to FIGS. 1 to 26 thereof, there is illustrated a journal 1 according to the invention which is suitable for coupling a wheel 2 to an axle 3. In use, the journal 1 is mounted in a bore 4 of the wheel 2, and the journal 1 has a reception space 5 for receiving part of the axle 3.

Figure 11:
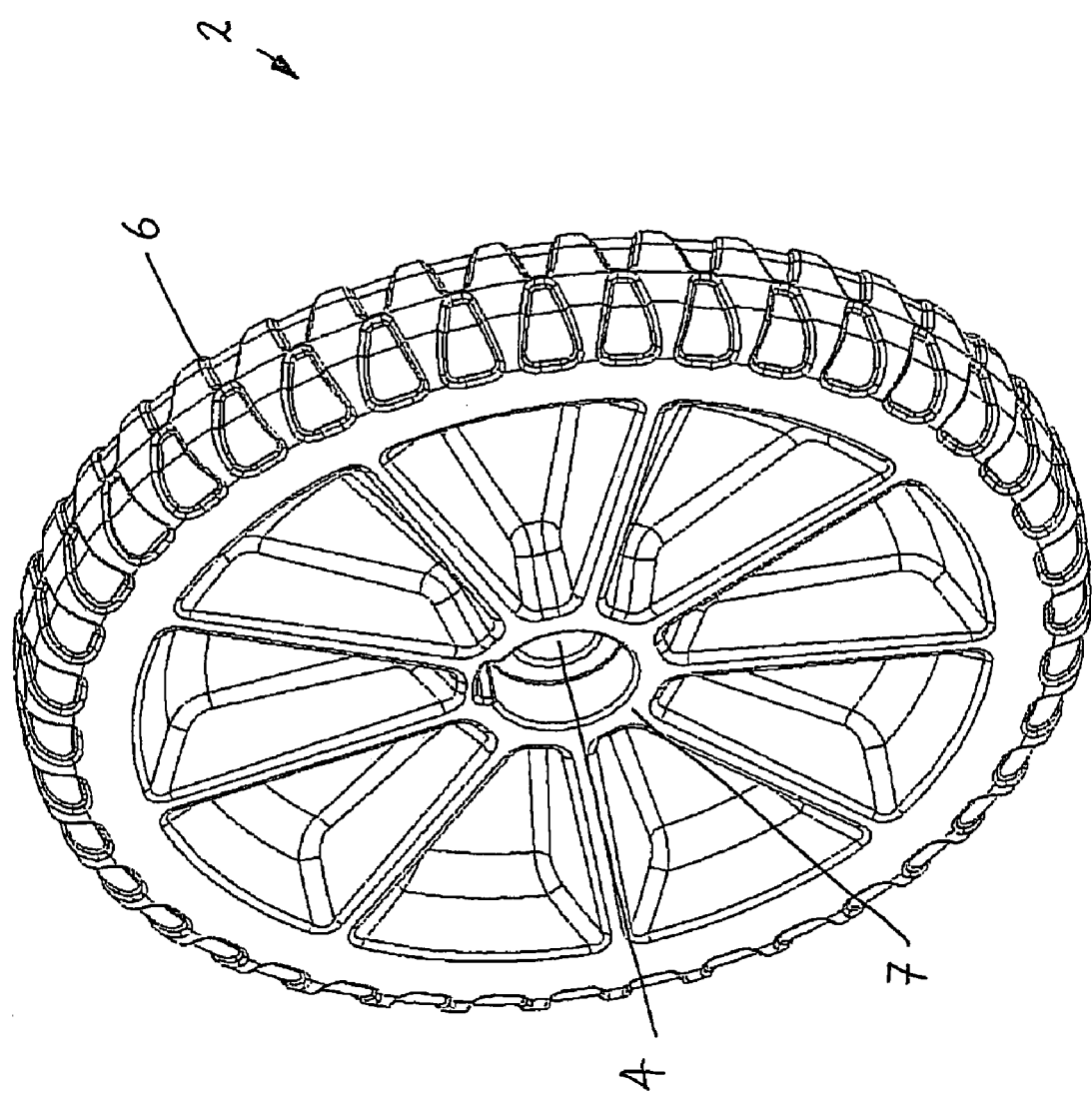
FIG. 11 is a perspective view of a wheel according to the invention.
Figure 12:
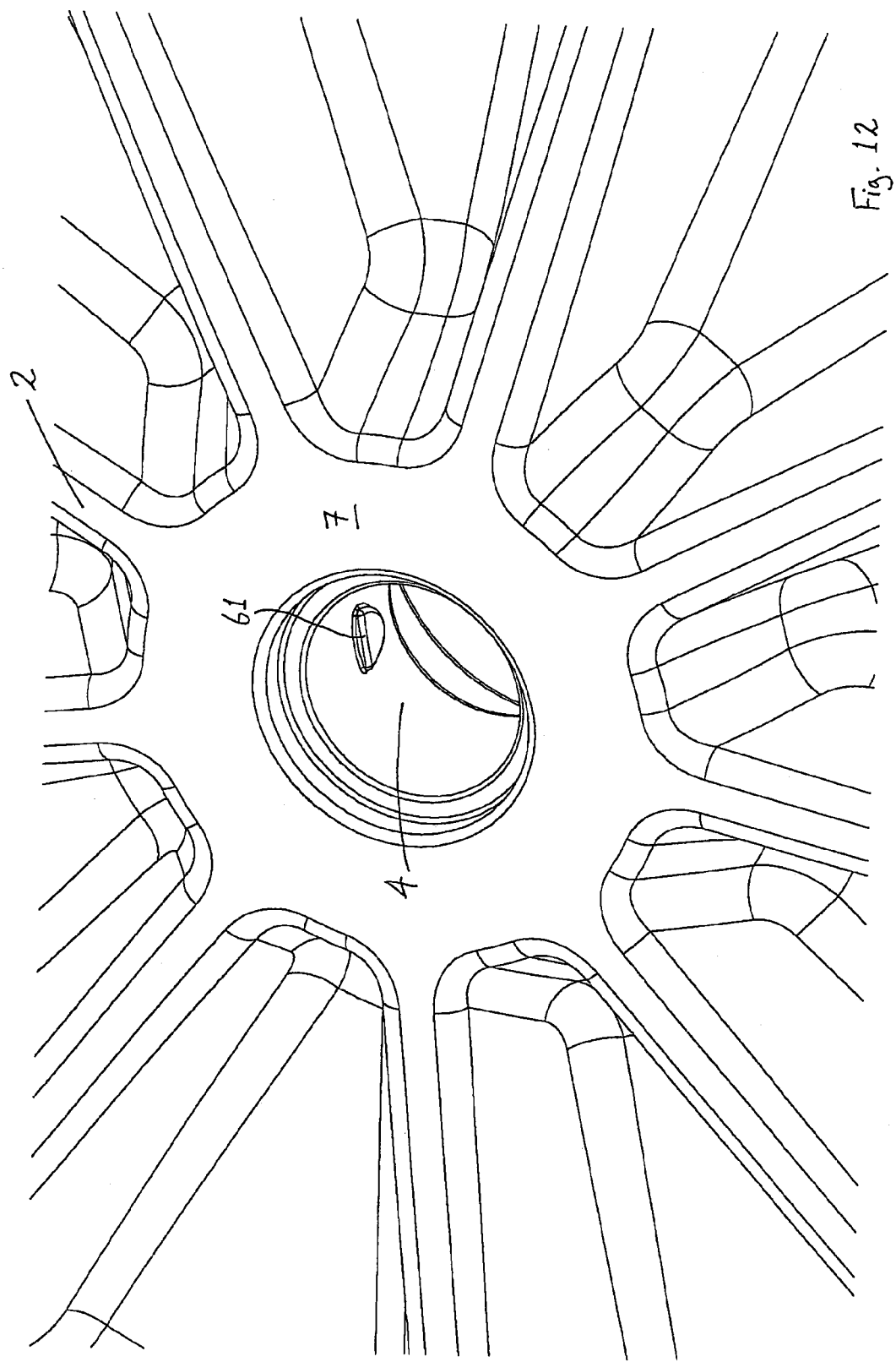
FIG. 12 is an enlarged, perspective view of a bore of the wheel of FIG. 11.
Figure 13:
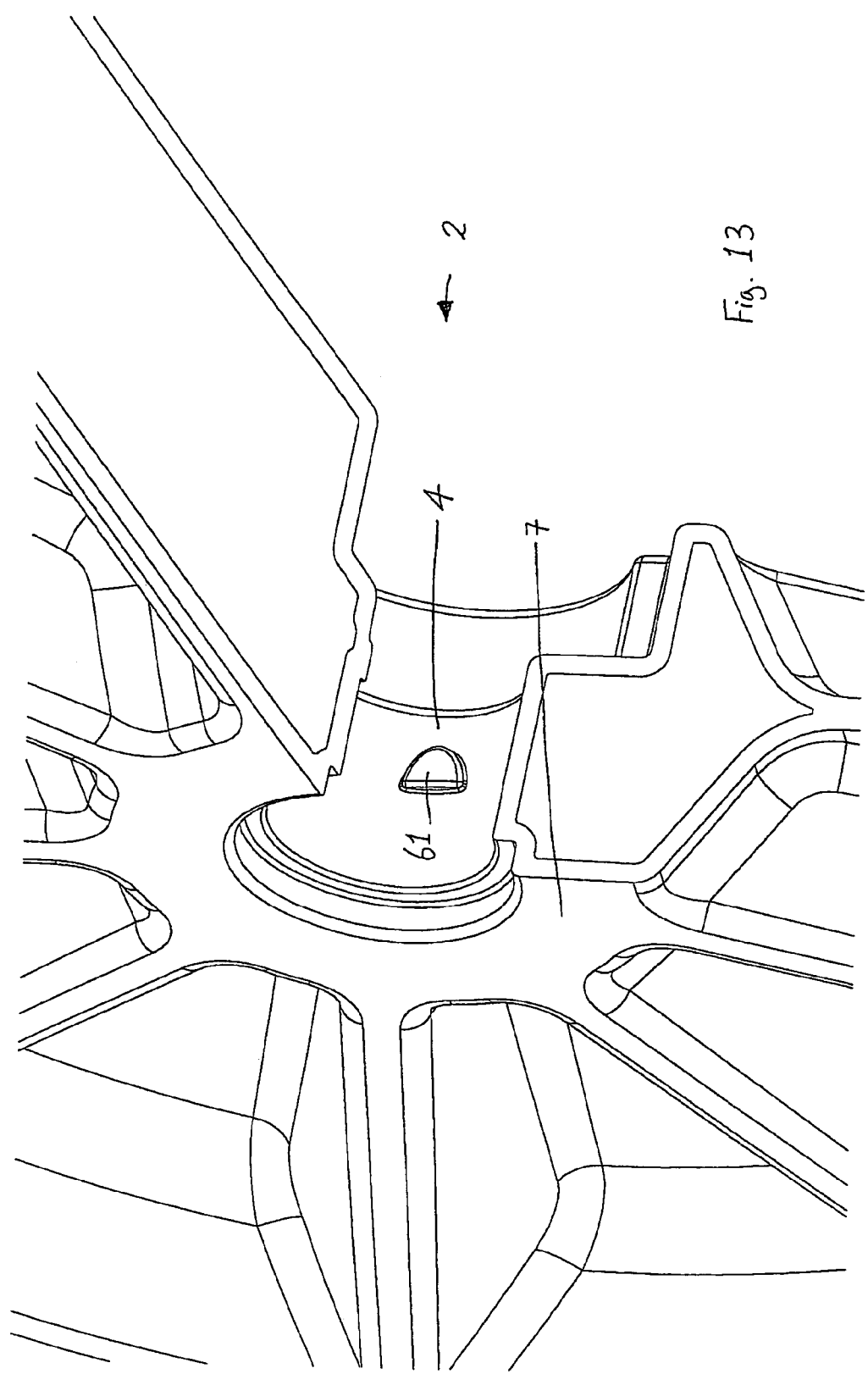
FIG. 13 is a partially cut-away, perspective view of the bore of FIG. 12.

In this case the wheel 2 is a blow moulded plastic wheel having an outer threaded rim 6 and an inner hub 7 (FIG. 11). The central bore 4 is provided through the hub 7.

Figure 17:
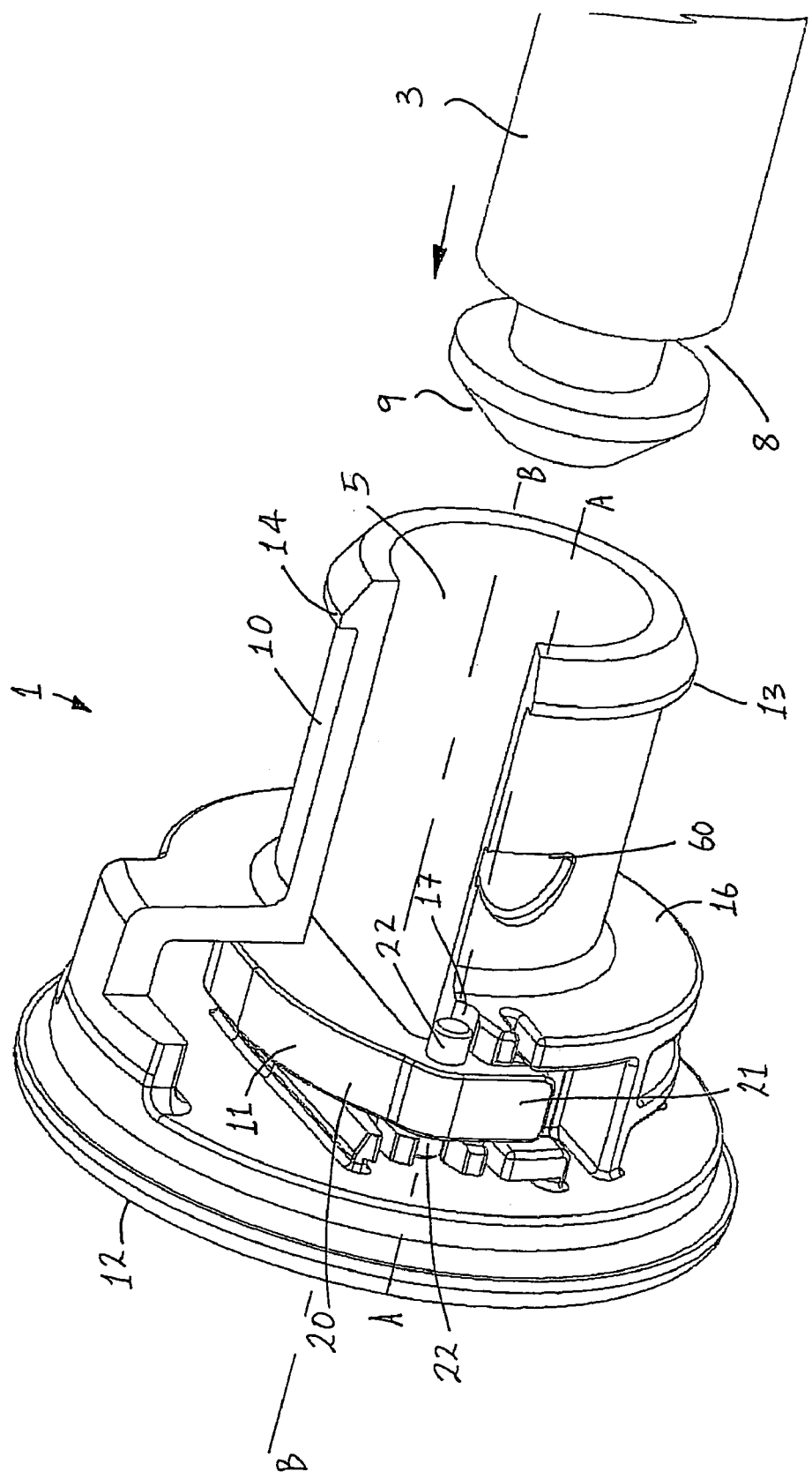
FIGS. 17 to 20 are partially cut-away, perspective views illustrating insertion of an axle into the journal of FIG. 5.

The axle 3 has a groove 8 extending radially inwardly of an outer surface of the axle 3, and extending circumferentially around the axle 3 (FIG. 17). The leading end of the axle 3 has a chamfered edge 9.

Figure 4:
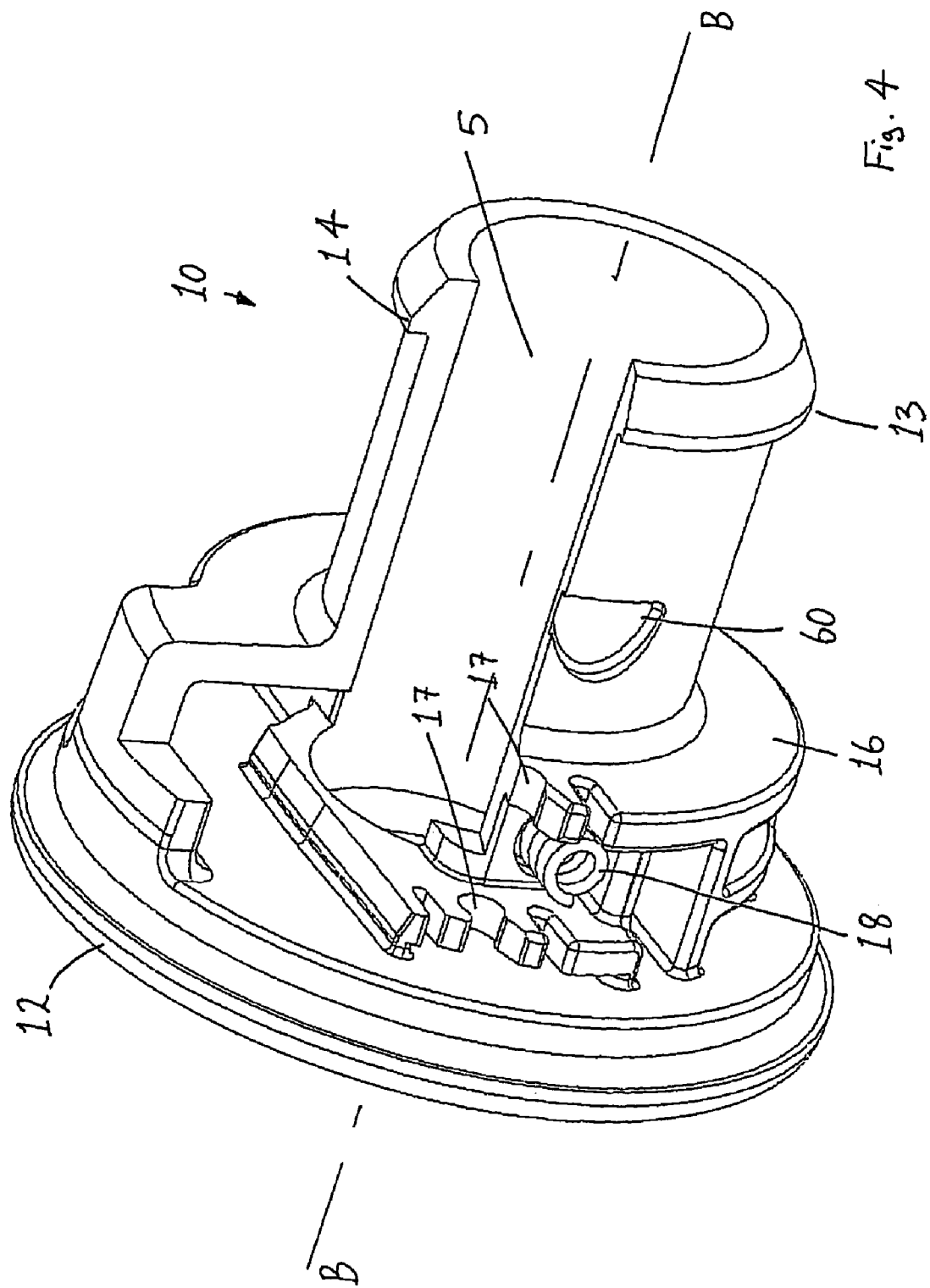
FIG. 4 is a partially cut-away, perspective view of the part of the journal and the biasing element of FIG. 3.
Figure 5:
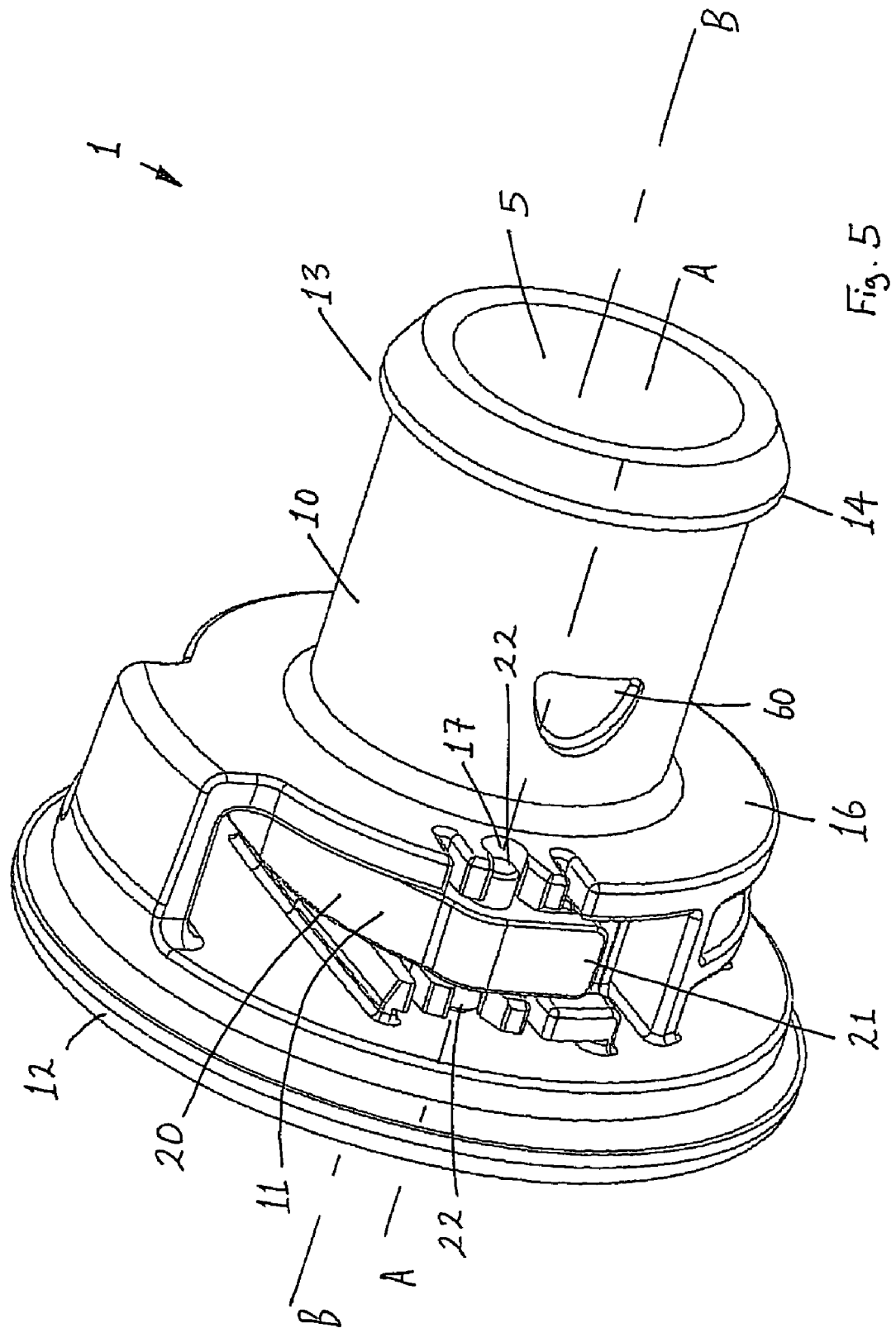
FIG. 5 is a perspective view of the complete journal of FIG. 1.

The journal 1 comprises a tubular main body portion 10 (FIGS. 1 to 4), and a separate locking element 11 (FIG. 5).

The main body portion 10 comprises an outer cap 12 at a closed end, and extends as a continuous cylindrical tube towards an insertion end 13. The reception space 5 is closed off at the closed end by the cap 12, and is open at the insertion end 13 to facilitate insertion of the axle 3 into the reception space 5. A continuous radially outwardly protruding lip 14 is formed at the insertion end 13. The lip 14 has a chamfered edge.

Figure 22:
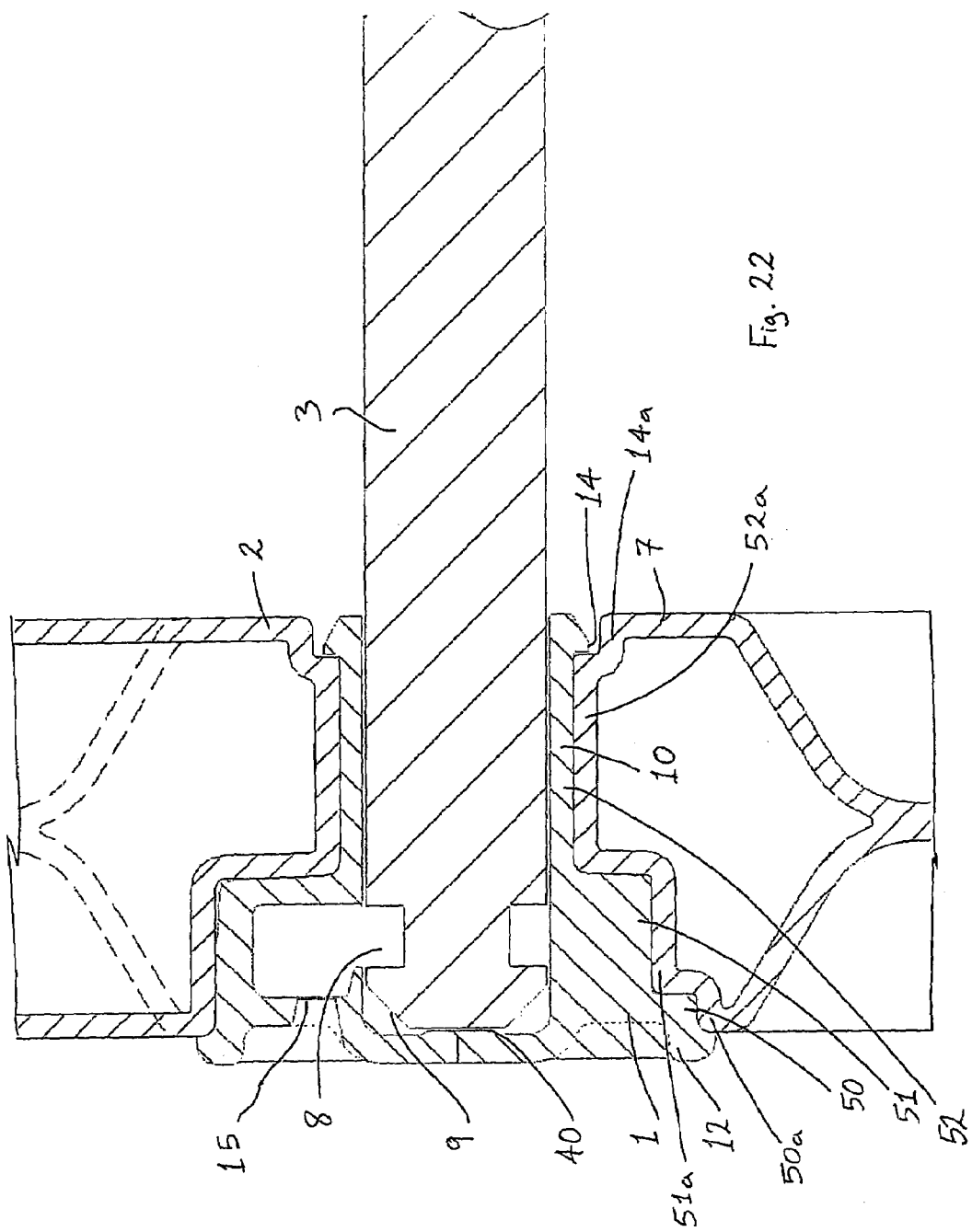
Figure 24:
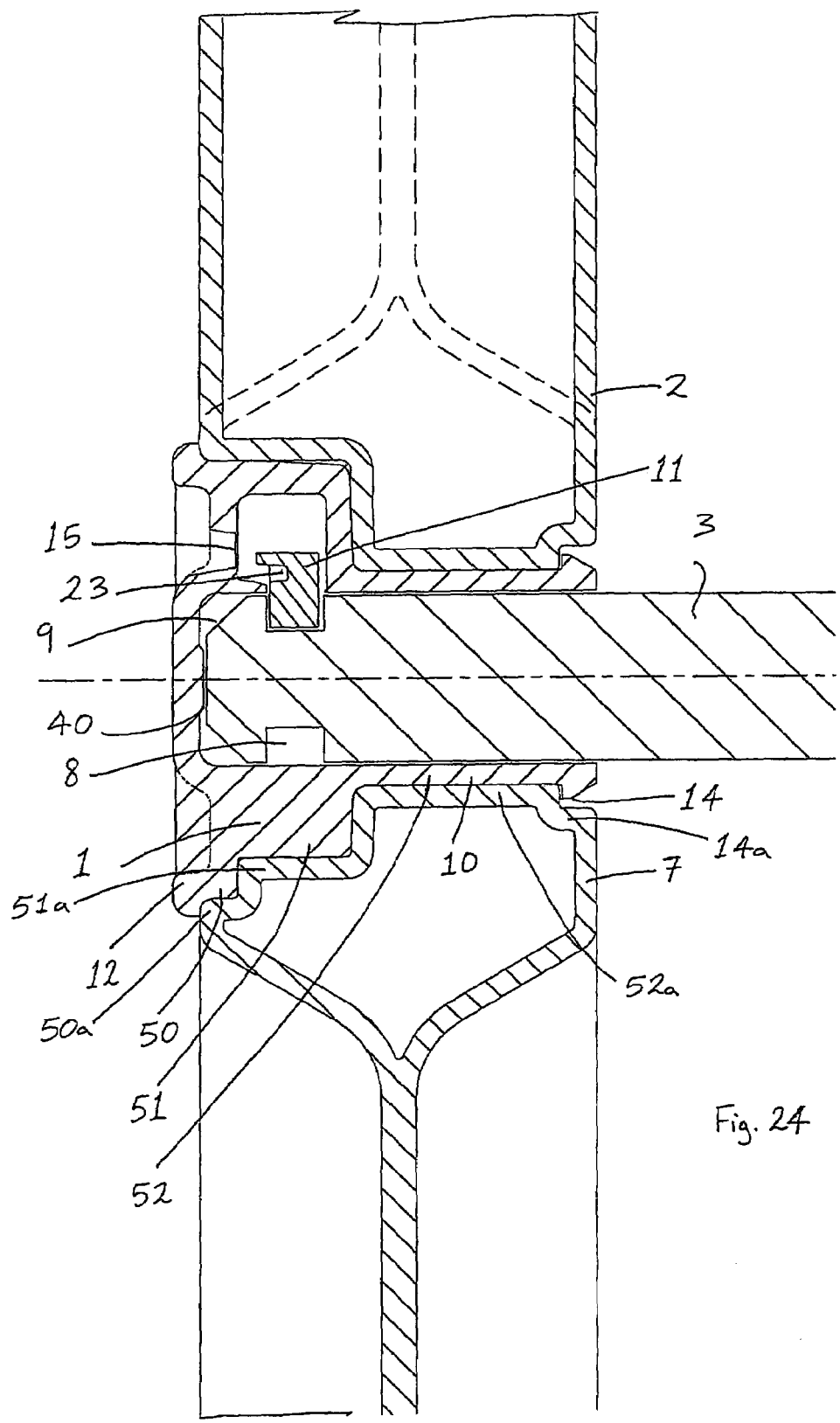

At the closed end of the reception space 5, the journal 1 comprises an upstanding stop formation 40 on the inner side of the cap 12, as illustrated in FIGS. 22 and 24. When the axle 3 is fully inserted into the reception space 5, the leading end 9 of the axle 3 engages against the stop formation 40.

The stop formation 40 upstands from the cap 12 a distance sufficient to precisely locate the axle 3 with the groove 8 aligned with the locking element 11, when the axle 3 is fully inserted into the reception space 5 with the leading end 9 engaging the stop formation 40 (FIG. 24). In this manner, the stop formation 40 provides a simple, yet effective means for accurately locating the axle 3 in the reception space 5 with the groove 8 aligned with the locking element 11.

The distance which the stop formation 40 upstands from the cap 12 may be easily controlled during the process of manufacturing the cap 12.

As illustrated in FIGS. 22 and 24, the area of engagement between the leading end 9 of the axle 3 and the stop formation 40 is less than the total area of the leading end 9. Thus the area of engagement between the axle 3 and the cap 12 is less than would occur if the inner side of the cap 12 were smooth. Therefore the frictional forces arising as a result of the engagement between the axle 3 and the cap 12 are minimised in the journal 1 due to the presence of the stop formation 40.

The stop formation 40 also prevents torque being transmitted from the axle 3 to the locking element 11, if for example the axle 3 was pushed towards and rotated relative to the journal 1.

As illustrated in FIGS. 21 to 24, an accessway 15 is defined through the outer cap 12 to facilitate access to the locking element 11 through the cap 12 for example with a tool, such as a screwdriver. The accessway 15 is normally covered with a thin layer of plastic to prevent ingress of dirt into the journal 1.

A radially outwardly projecting collar 16 is provided axially spaced-apart from the outer cap 12 to reinforce the journal 1. A pivot receiving cradle 17 is formed in the collar 16 and in the outer cap 12.

The journal 1 comprises a coiled compression spring 18 mounted around an outwardly protruding spigot 19 between the collar 16 and the outer cap 12.

A recess 60 is provided in the sidewall of the main body portion 10, and the bore 4 of the wheel 2 has a corresponding protrusion 61. The depth of the recess 60 is less than the thickness of the sidewall of the main body portion 10, such that the recess 60 extends through only a part of the sidewall. When the journal 1 is mounted in the bore 4, the protrusion 61 is received in the recess 60. In this manner the journal 1 is retained in position in the bore 4, and the journal 1 is prevented from rotating while mounted in the bore 4.

As illustrated in FIGS. 21 to 24, the main body portion 10 of the journal 1 has a step-like cross-sectional configuration, and the bore 4 of the wheel 2 has a corresponding step-like cross-sectional configuration.

As illustrated in FIGS. 22 and 24, moving from the closed end to the insertion end 13, the main body portion 10 comprises the outer cap 12, a first portion 50, a second portion 51, a third portion 52 and the lip 14. The first portion 50 has a smaller outer diameter than the outer cap 12. The second portion 51 has a smaller outer diameter than the first portion 50 around a part of the circumference of the journal 1, and has the same outer diameter as the first portion 50 around the remainder of the circumference. The third portion 52 has a smaller outer diameter than the second portion 51, and a smaller outer diameter than the lip 14. When the journal 1 is mounted in the bore 4, the first, second and third portions 50, 51, 52 are all located within the bore 4.

Similarly the bore 4 comprises a first portion 50a, a second portion 51a, a third portion 52a and a lip portion 14a. The first portion 50a is located at one end of the bore 4 and the lip portion 14a is located at the opposite end of the bore 4, as illustrated in FIGS. 22 and 24. The second portion 51a has a smaller inner diameter than the first portion 50a around a part of the circumference of the bore 4, and has the same inner diameter as the first portion 50a around the remainder of the circumference. The third portion 52a has a smaller inner diameter than the second portion 51a, and a smaller inner diameter than the lip portion 14a.

Figure 6:
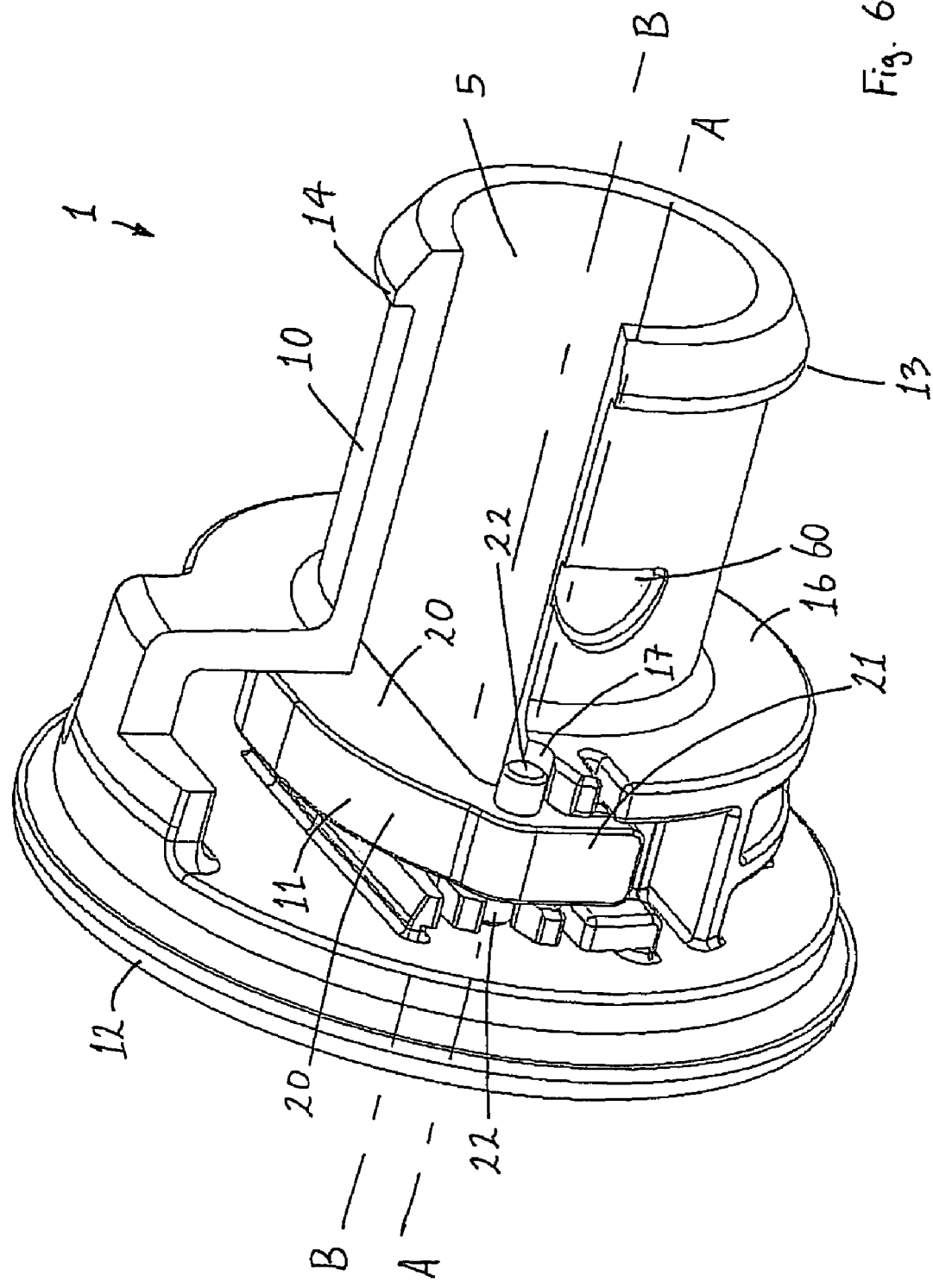
FIG. 6 is a partially cut-away, perspective view of the journal of FIG. 5 in a secured position.

The locking element 11 comprises a locking arm 20 and an integral actuating arm 21. A pivot axis A-A extends through the locking element 11 at the region of the junction between the locking arm 20 and the actuating arm 21 (FIG. 6). A pair of oppositely directed pivot extensions 22 are formed extending outwardly from the locking element 11 along the pivot axis A-A.

Figure 23:
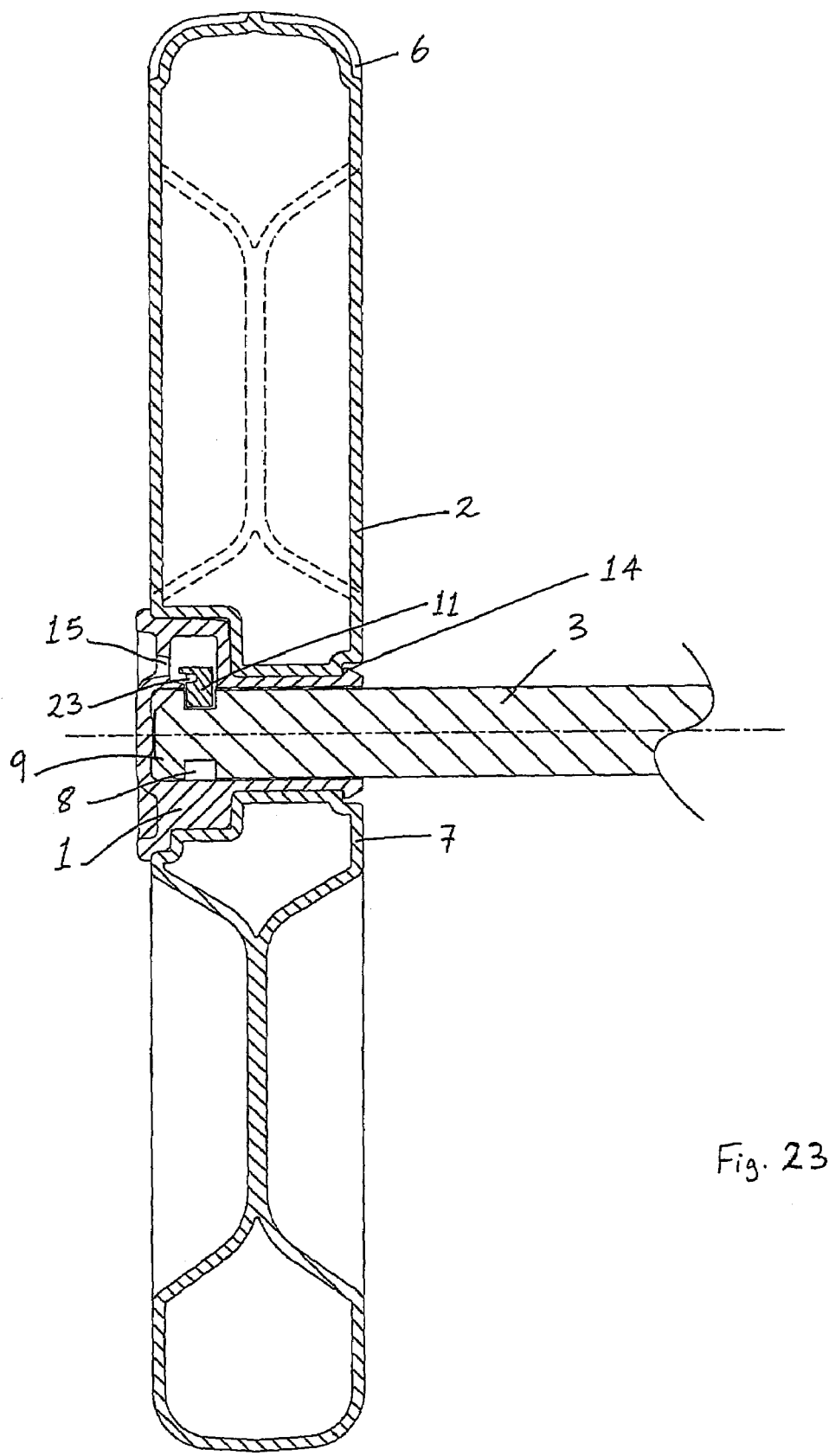

As illustrated in FIGS. 23 and 24, an engagement recess 23 is provided in the locking arm 20 to enable the locking element 11 to be engaged, for example by a tool, such as a screwdriver.

Figure 8:
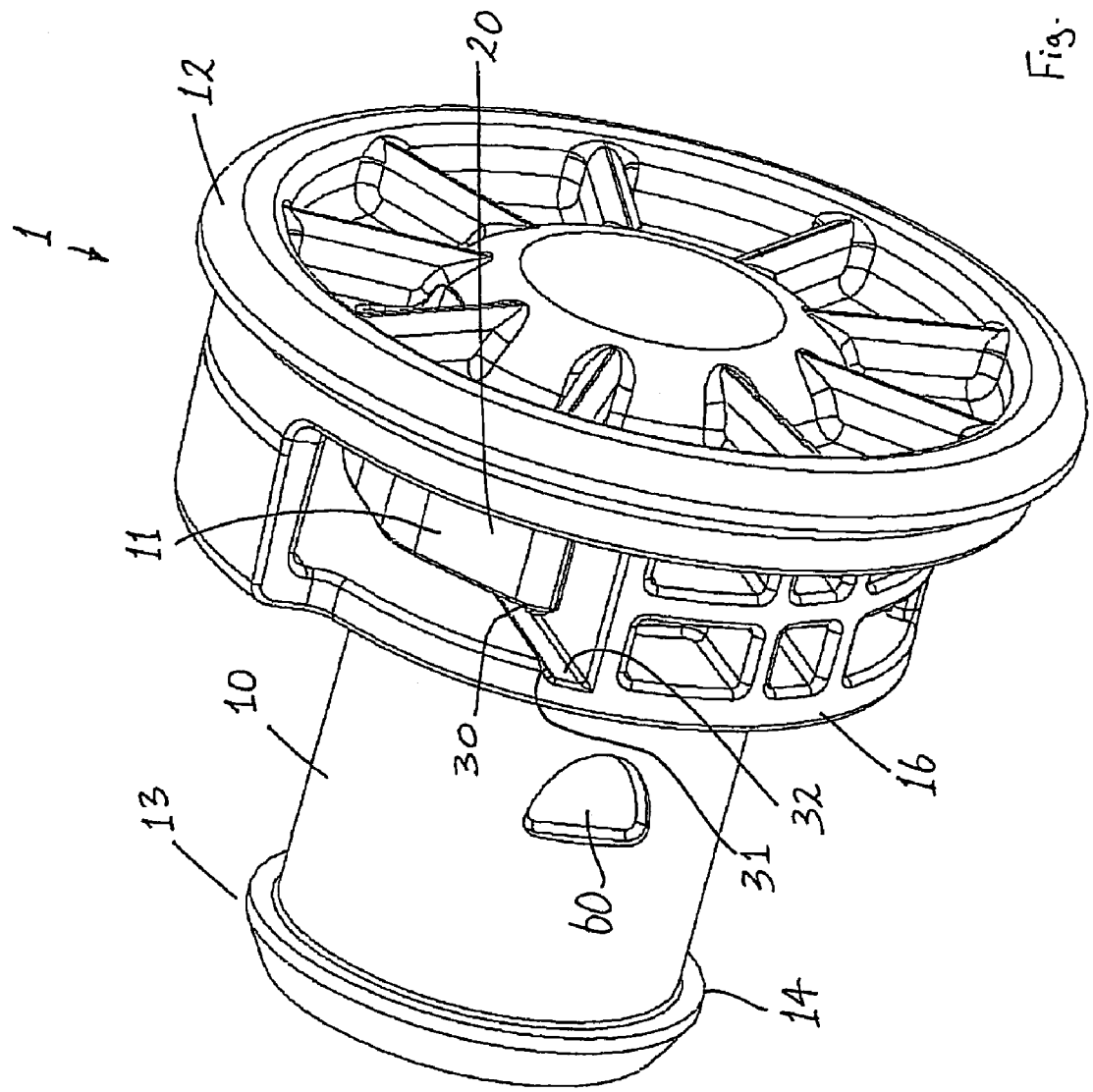
FIGS. 8 and 9 are perspective views of the journal of FIG. 5 in the secured position.
Figure 9:
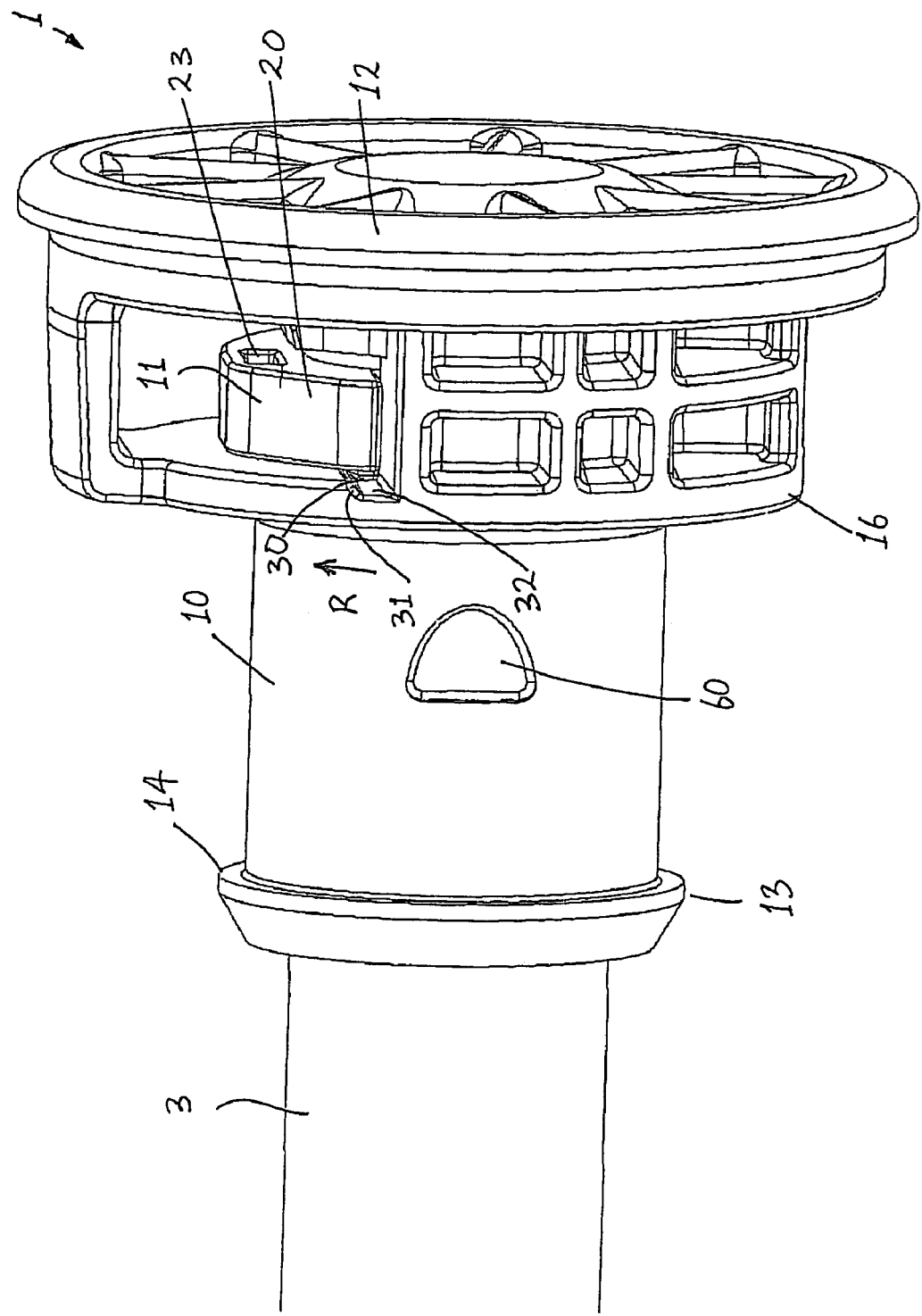
Figure 10:
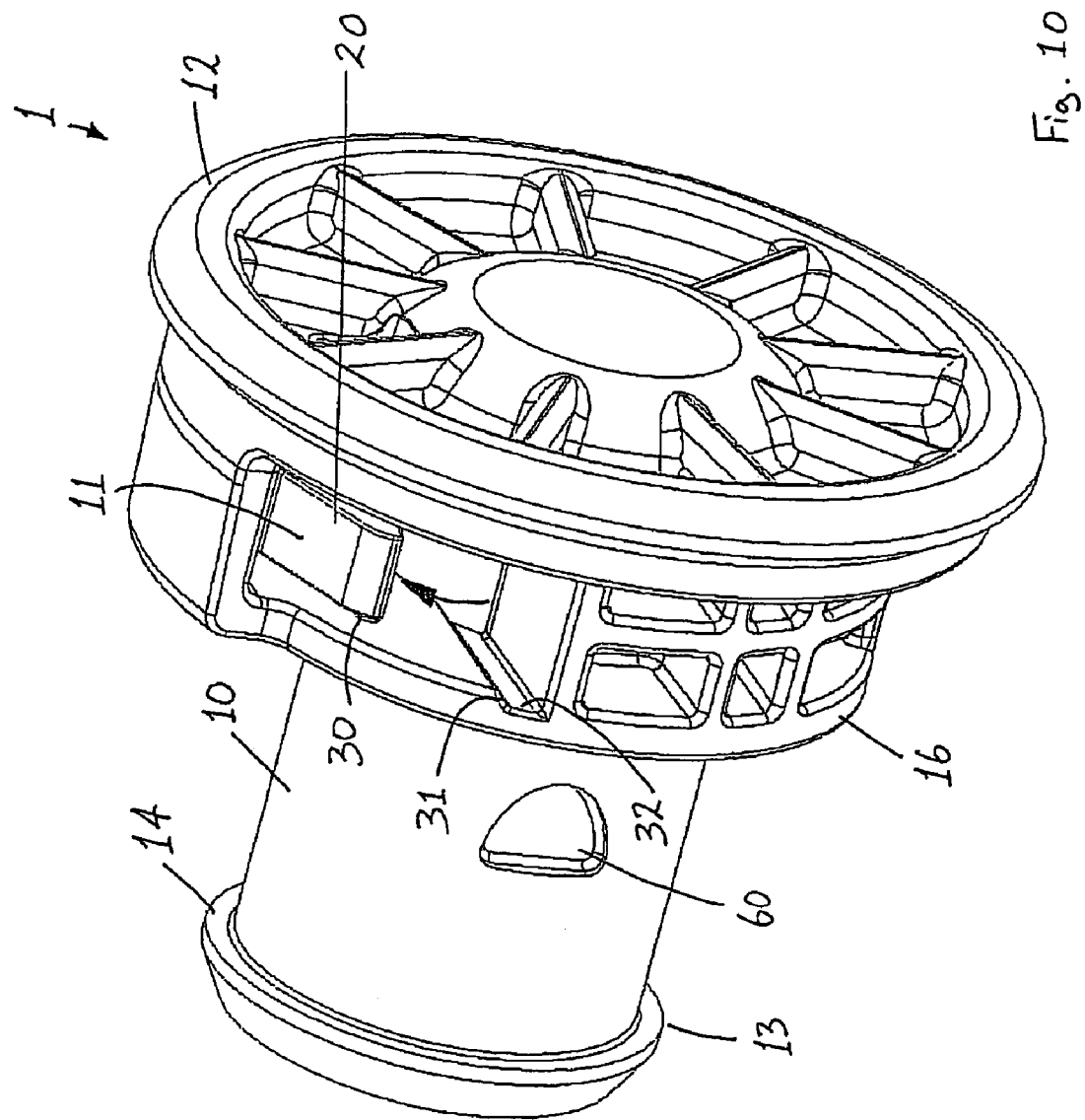
FIG. 10 is a perspective view of the journal of FIG. 5 in the release position.

The locking arm 20 of the locking element 11 has a lock protrusion 30 which protrudes from the side of the locking element 11, which is closest to the insertion end 13, towards the insertion end 13, as illustrated in FIGS. 8 to 10. The main body portion 10 has a corresponding overhang part 31 which protrudes away from the insertion end 13 to form a lock recess 32.

The lock protrusion 30 may be received in the lock recess 32 when the locking element 11 is in the secured position. The lock protrusion 30 engages in a radially outward direction R against a surface of the overhang part 31, when the locking element 11 is in the secured position. In this manner, the locking element 11 will be releasably locked in the secured position, thus securing the axle 3 in position in the reception space 5. In particular, by locking the locking element 11 in the secured position in this manner, this arrangement prevents the locking element 11 being inadvertently pivoted from the secured position to the release position, when for example an axial load is applied to the axle 3, while the axle 3 is rotated relative to the journal 1. The user can therefore precisely control when the locking element 11 is moved from the secured position to the release position.

A suitable material for the locking element 11 is a metallic material or a plastics material. In this case the actuating arm 21 is constructed of steel.

Figure 3:
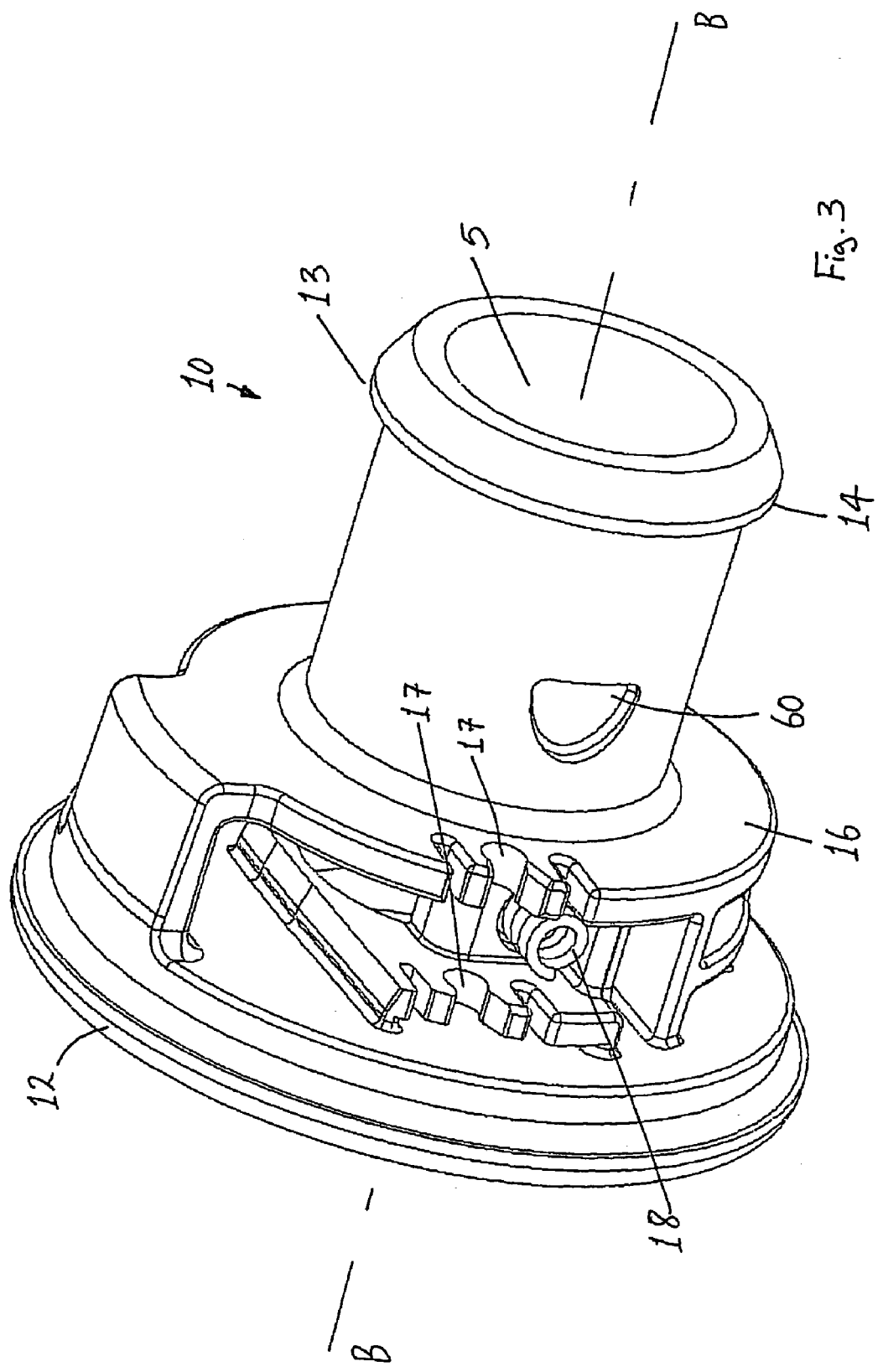
FIG. 3 is a perspective view of the part of the journal of FIG. 1 with a biasing element mounted thereto.

The journal 1 is assembled by mounting the coiled spring 18 around the spigot 19 (FIGS. 3 and 4). The locking element 11 is then mounted to the main body portion 10 by locating the pivot extensions 22 into the co-operating pivot cradles 17 in a snap-fit manner (FIGS. 5 and 6).

Figure 7:
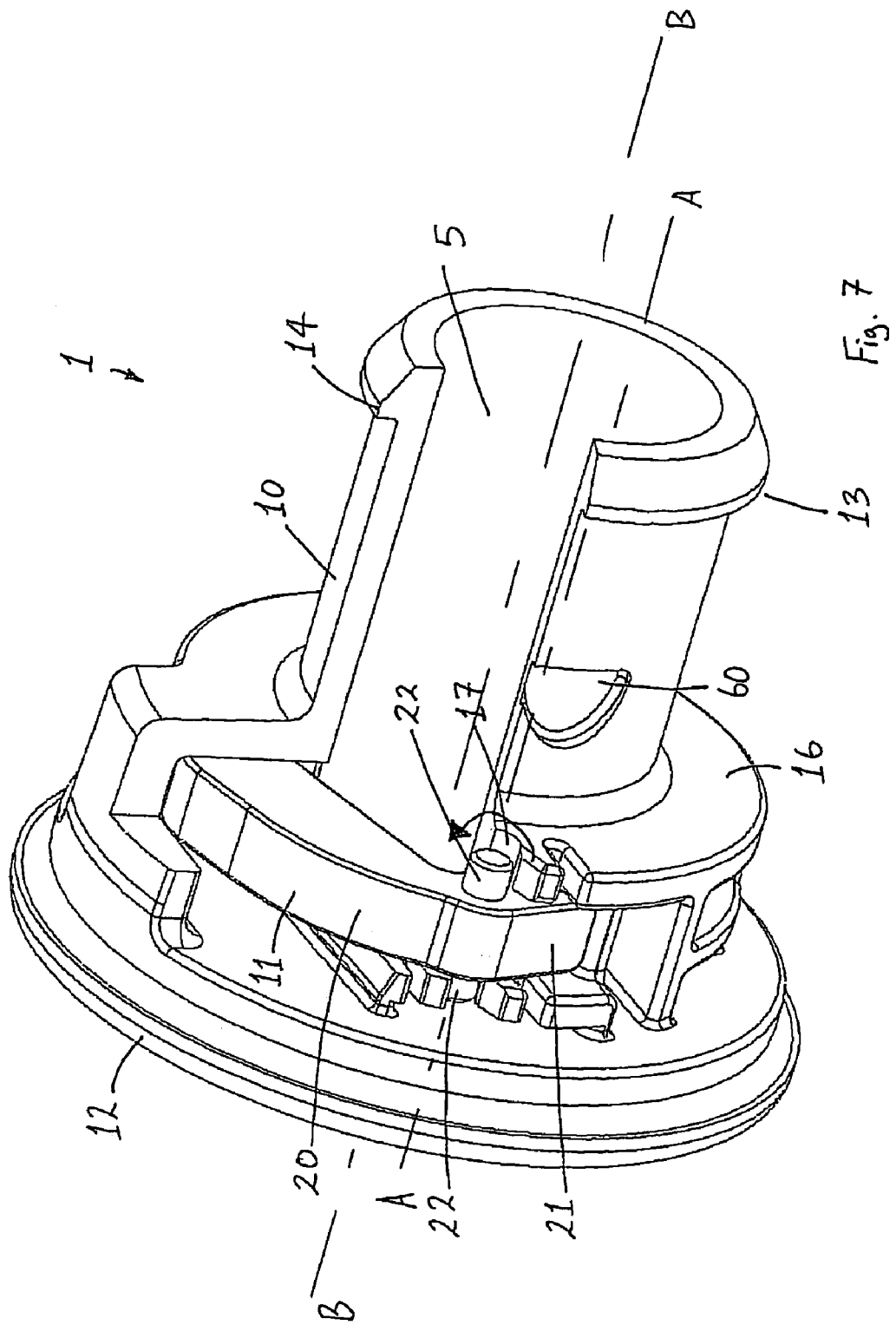
FIG. 7 is a partially cut-away, perspective view of the journal of FIG. 5 in a release position.

When assembled, the locking element 11 is pivotable about the pivot axis A-A between a secured position (FIG. 6), and a release position (FIG. 7). With the locking element 11 in the release position, the axle 3 is movable into and out of the reception space 5. With the locking element 11 in the secured position, the locking arm 20 is engaged with the axle groove 8 to secure the axle 3 in position in the reception space 5 (FIGS. 20 to 24).

The coiled spring 18 bears against the actuating arm 21 of the locking element 11 to repel the actuating arm 21 and thereby bias the locking arm 20 towards the secured position. The spring 18 provides a particularly low cost and simple means of biasing the locking arm 20 towards the secured position.

Figure 14:
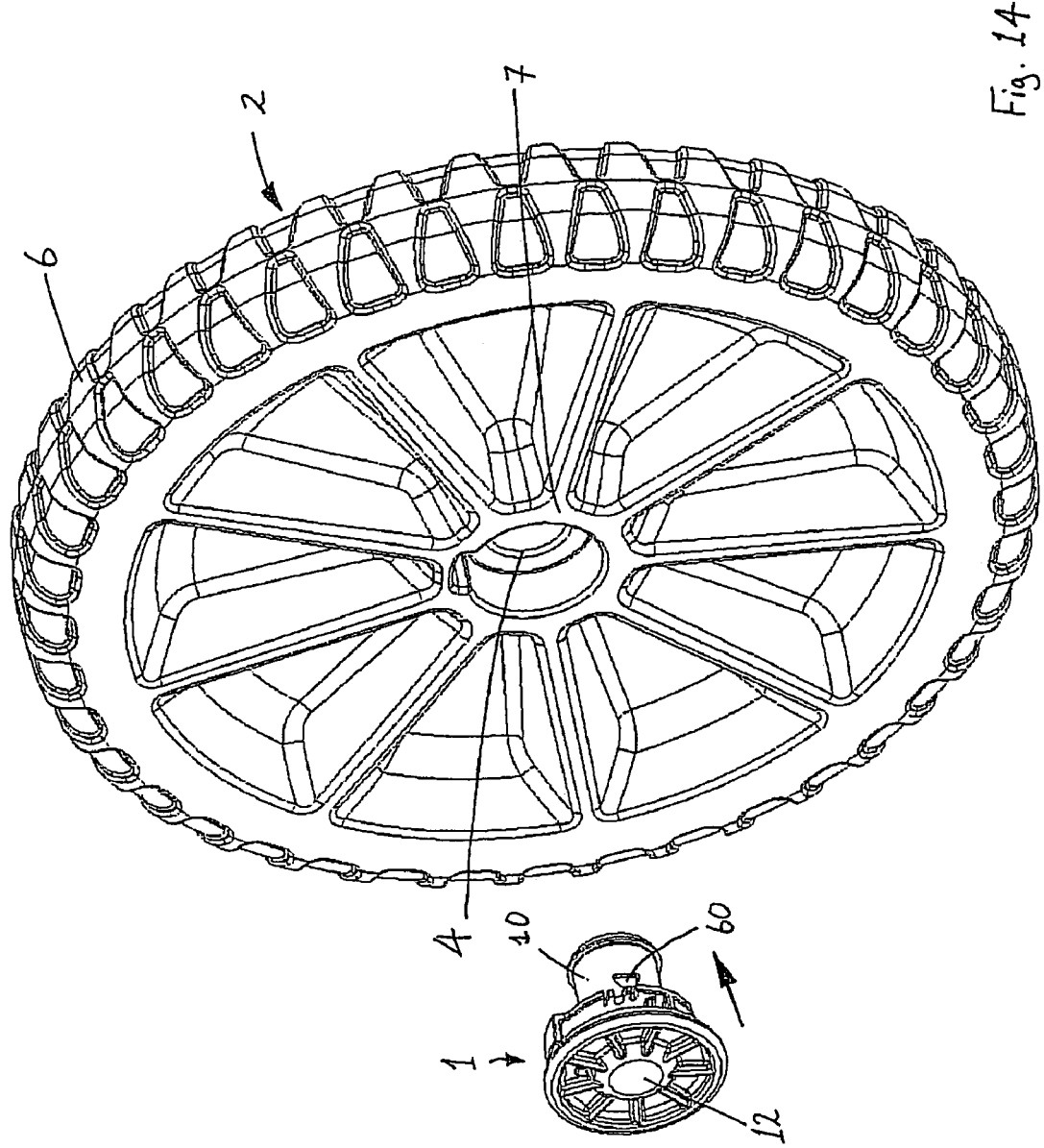
FIGS. 14 and 15 are perspective views illustrating mounting of the journal of FIG. 5 in the bore of FIG. 12.
Figure 15:
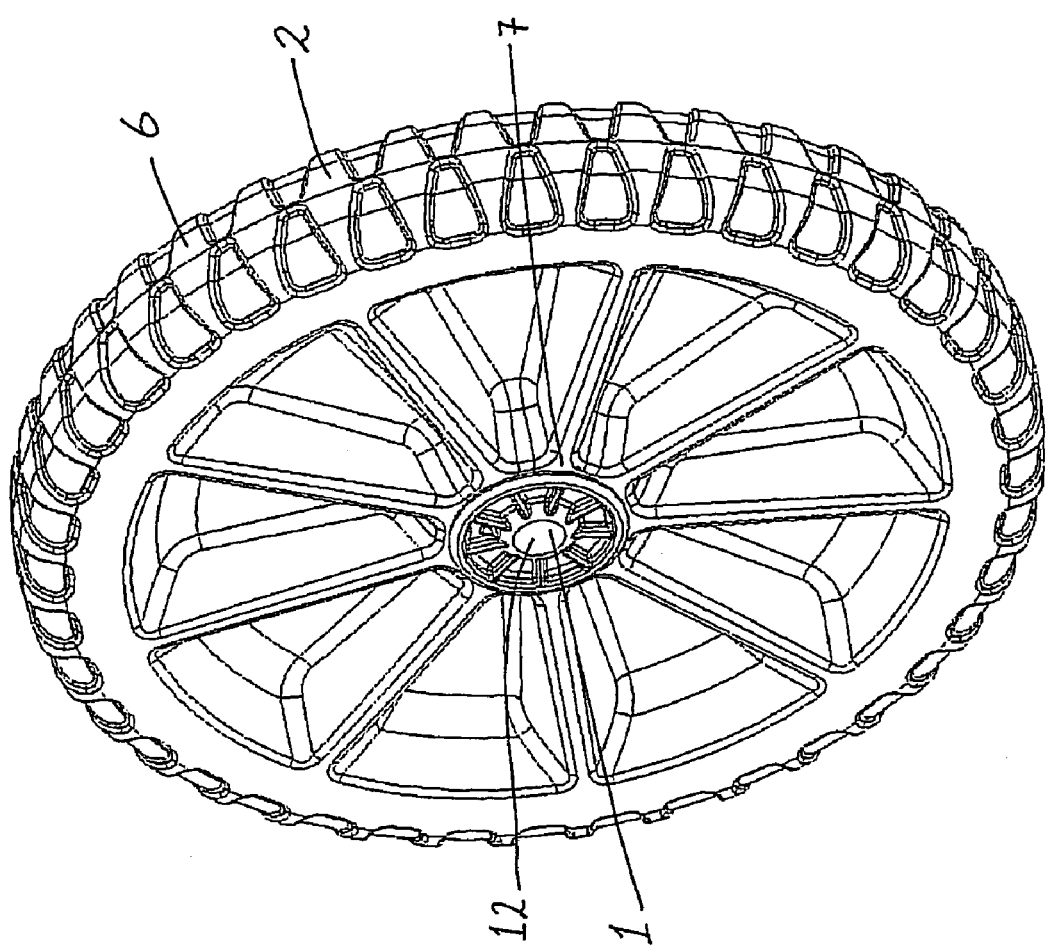
Figure 16:
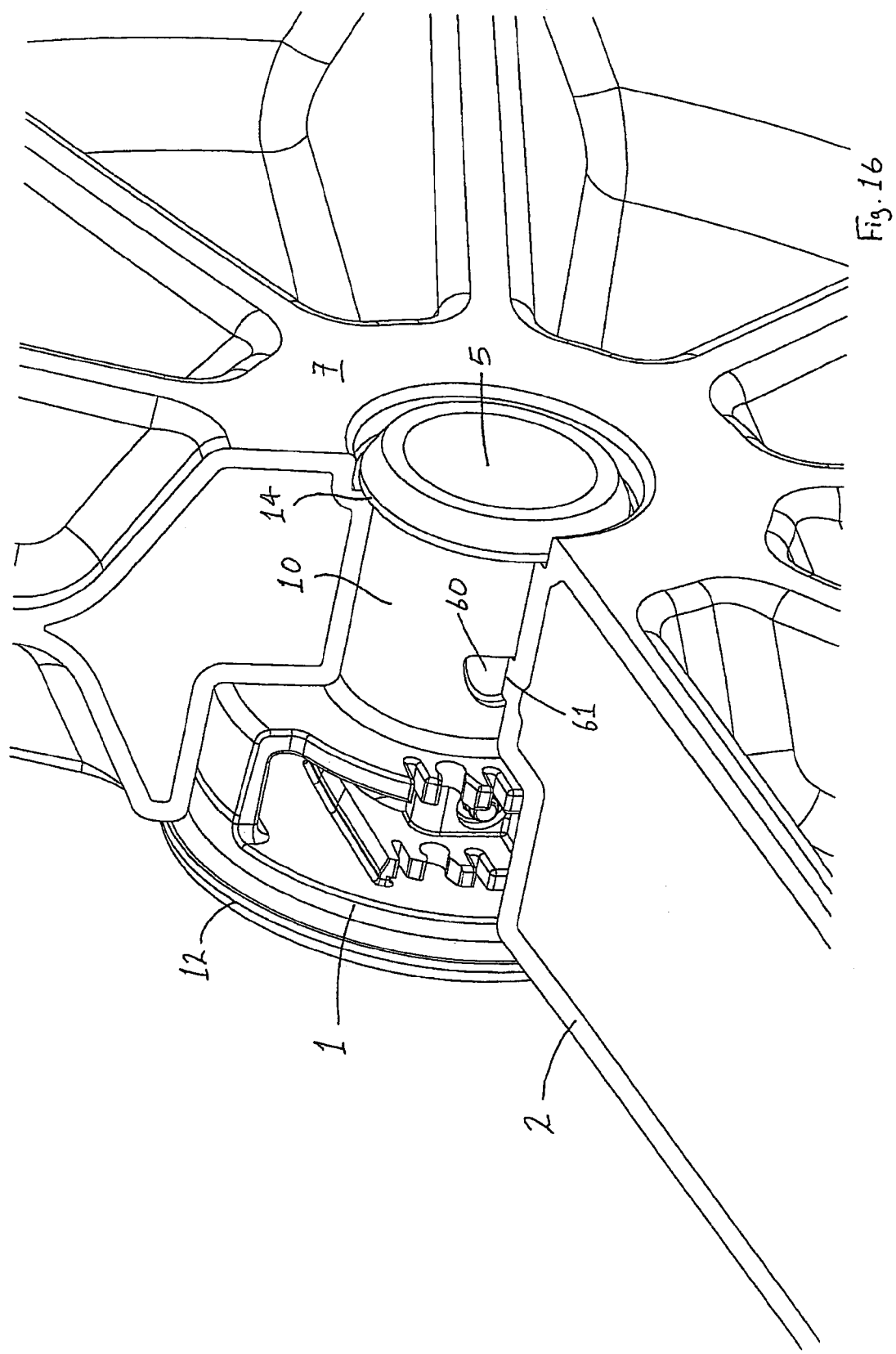
FIG. 16 is a partially cut-away, perspective view of the journal of FIG. 5 mounted in the bore of FIG. 12.

The journal 1 is coupled to the wheel 2 by inserting the insertion end 13 of the main body portion 10 into the bore 4 of the wheel 2 (FIG. 14). As the main body portion 10 enters the bore 4, the main body portion 10 is compressed inwardly by the engagement of the chamfered lip 14 with the internal wall of the bore 4.

When the lip 14 reaches a shoulder defined in the bore 4 between the lip portion 14a and the third portion 52a, the lip 14 moves outwardly to engage with the annular shoulder. The cap 12 engages with a shoulder defined by the open mouth of the bore 4 at the outer end of the hub 7, with the cap 12 remaining externally of the bore 4. In addition, the protrusion 61 on the bore 4 is received in the recess 60. In this manner the journal 1 is secured in position in the bore 4.

The engagement of the protrusion 61 in the recess 60 is particularly effective at retaining the journal 1 secured in position in the bore 4, because the walls of the recess 60 engage the protrusion 61 at each side of the protrusion 61.

When the journal 1 is mounted in the bore 4, the journal first portion 50 fits snugly within the bore first portion 50a engaging the wall of the bore first portion 50a, the journal second portion 51 fits snugly within the bore second portion 51a engaging the wall of the bore second portion 51a, and the journal third portion 52 fits snugly within the bore third portion 52a engaging the wall of the bore third portion 52a. This step-like mounting configuration has been found to result in enhanced support.

In particular it has been found that the possibility of bending of the axle 3 has been reduced.

Figure 18:
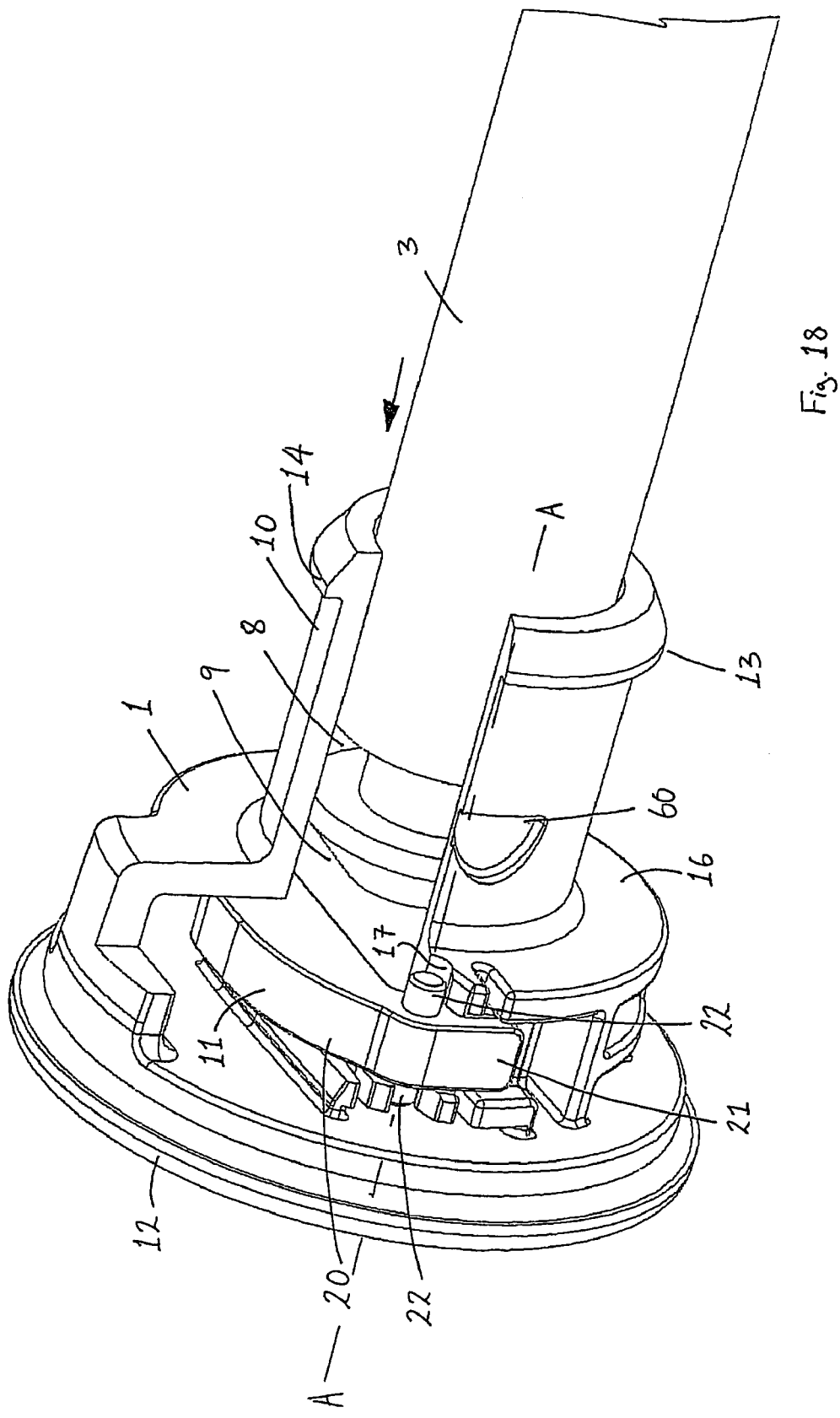
Figure 19:
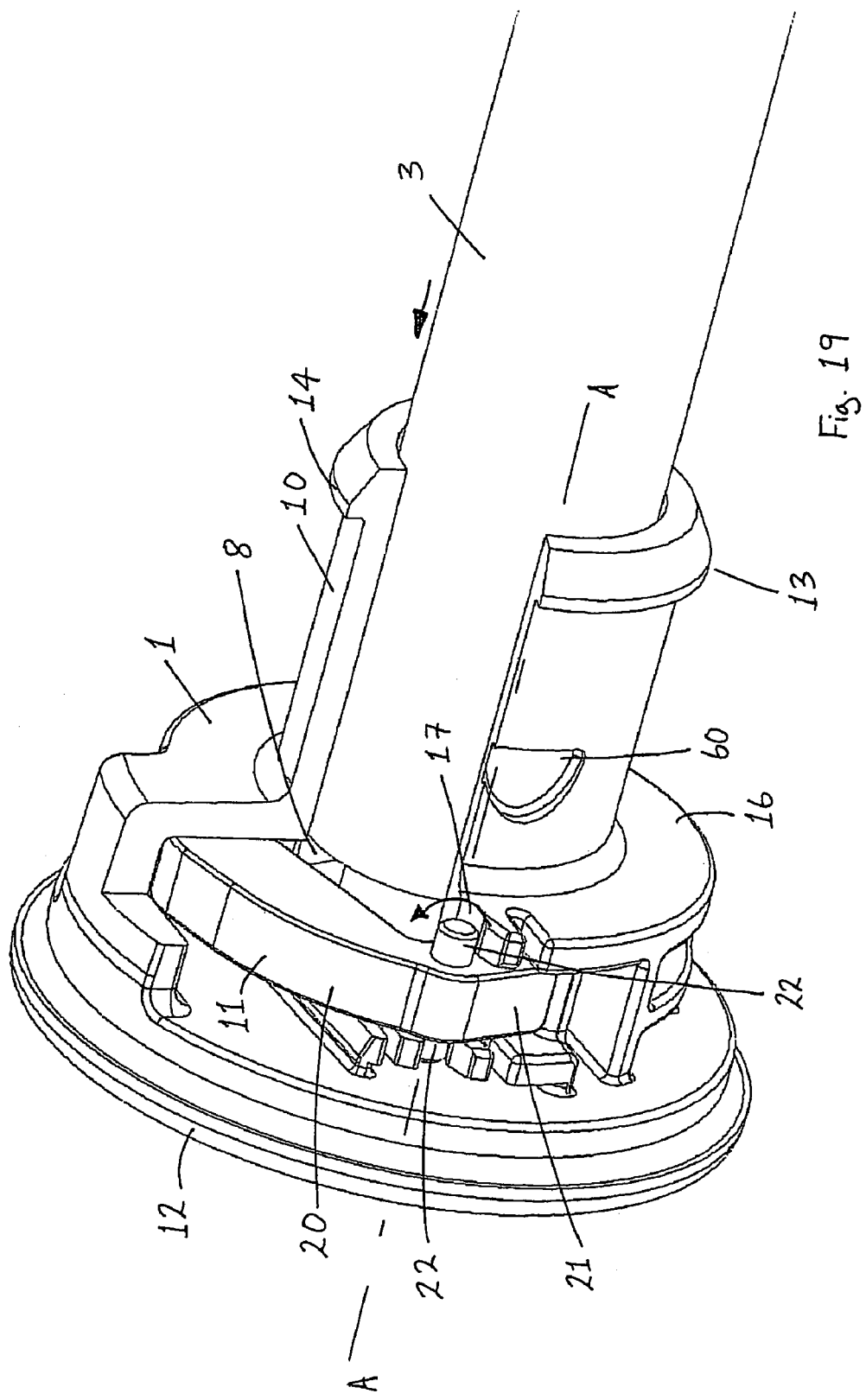

To couple the axle 3 to the journal 1, the leading end 9 of the axle 3 is inserted into the reception space 5 of the main body portion 10 (FIGS. 17 and 18). As the leading end 9 passes the locking element 11, the locking arm 20 is pivoted from the secured position to the release position by a camming engagement of the chamfered leading end 9 with the locking arm 20 (FIG. 19). This pivoting of the locking element 11 causes the spring 18 to compress.

Figure 20:
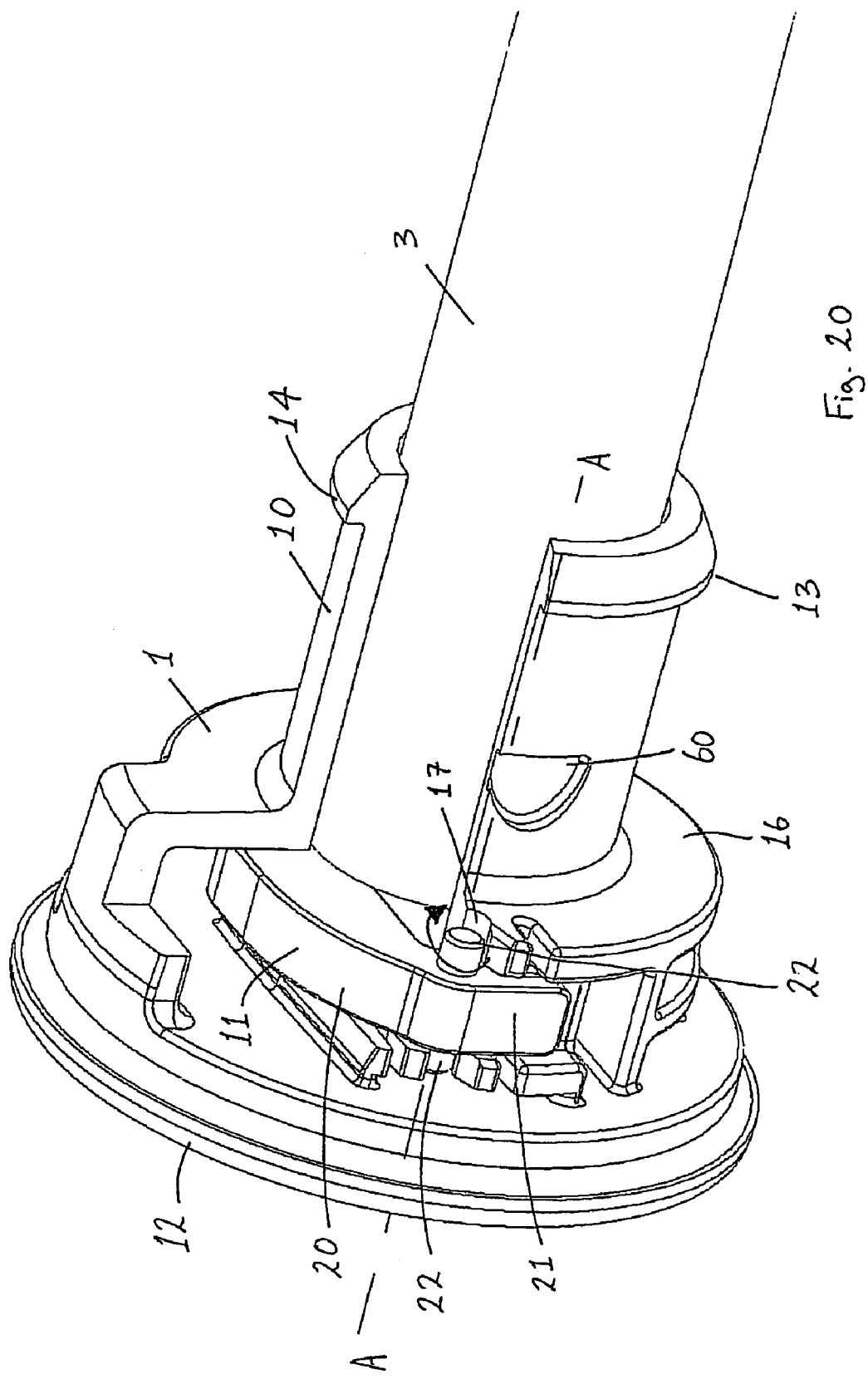
Figure 21:
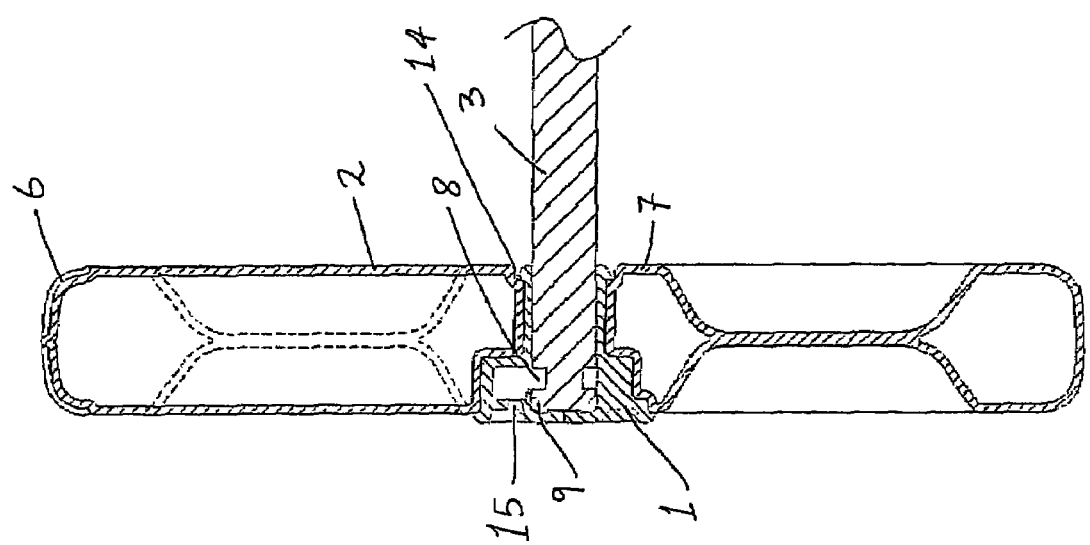
FIGS. 21 to 24 are cross-sectional, side views of the axle of FIGS. 17 to 20 secured in position in the journal of FIG. 16 which is mounted in the bore of FIG. 16.

When the leading end 9 reaches the cap 12 and engages the stop formation 40, the axle groove 8 is aligned with the locking element 11. Under the biasing action of the coiled spring 18, the locking arm 20 is pivoted from the release position to the secured position (FIG. 20). The axle 3 is thus secured in position within the reception space 5 of the journal 1.

The shape of the locking arm 20 prevents any attempted retraction of the axle 3 from causing the locking element 11 to pivot from the secured position to the release position.

It is noted that the pivot axis A-A defined by the pivot extensions 22 about which the locking element 11 pivots is substantially parallel to the longitudinal axis B-B of the reception space 5 (FIG. 6). In addition the pivot axis A-A is radially offset from the longitudinal axis B-B of the reception space 5. This arrangement facilitates the location of a relatively large locking element 11 with the relatively small space available within the wheel bore 4. Thus the locking element 11 may have a relatively large area of engagement with the axle 3 to assist in distributing the forces generated during use of the wheel 2.

Figure 25:
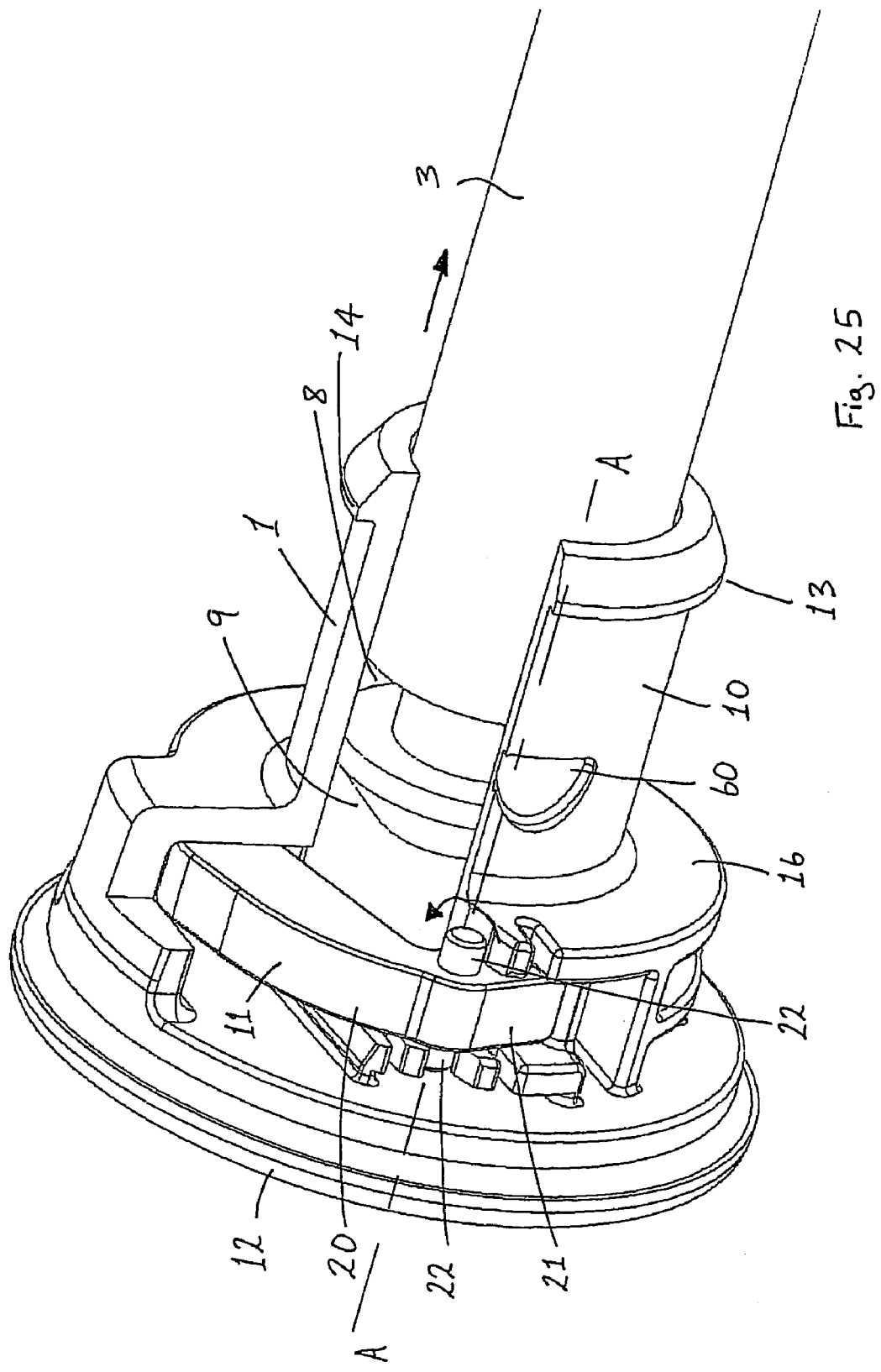
FIGS. 25 and 26 are partially cut-away, perspective views illustrating withdrawal of the axle of FIGS. 17 to 20 from the journal of FIG. 5.
Figure 26:
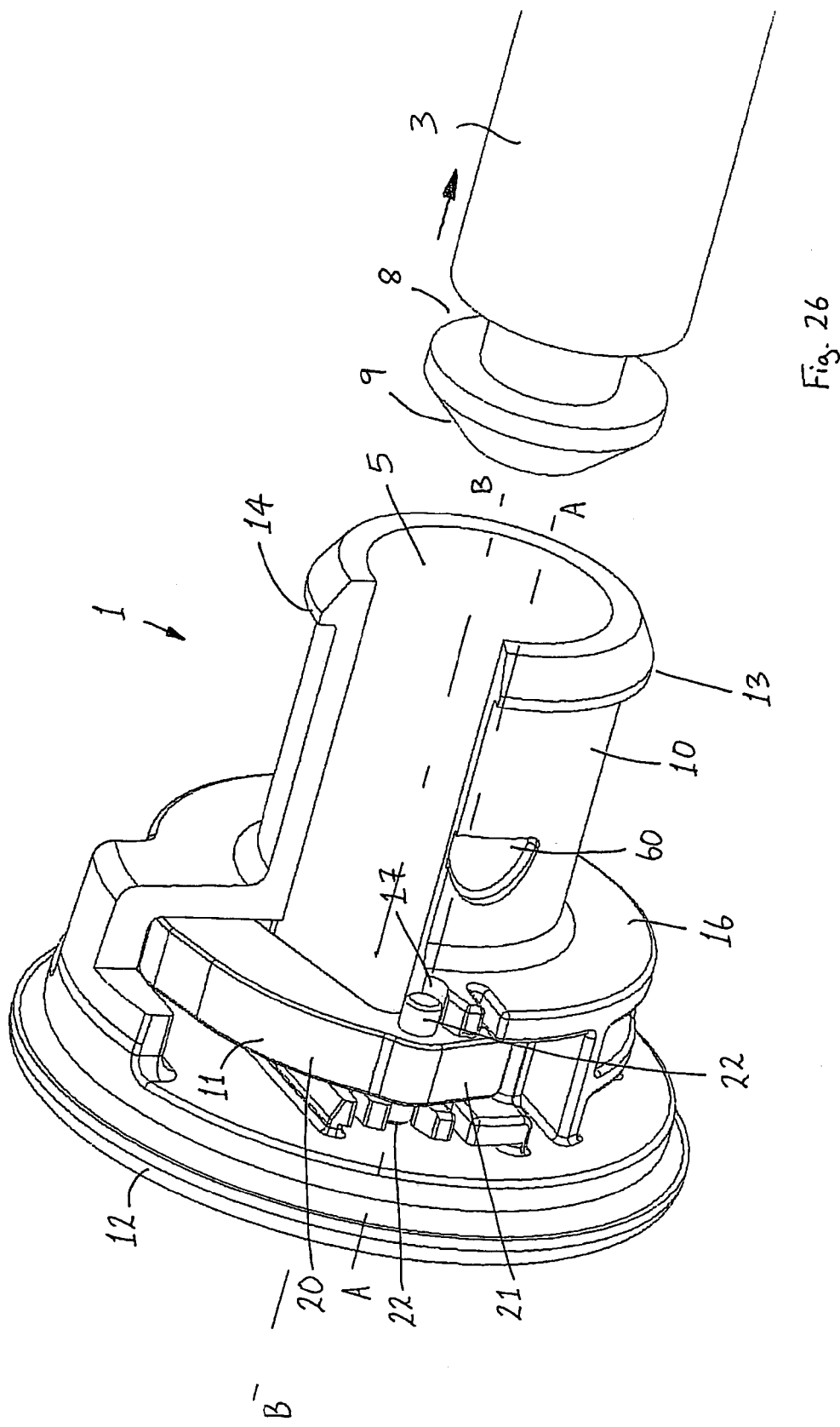
Figure 27:
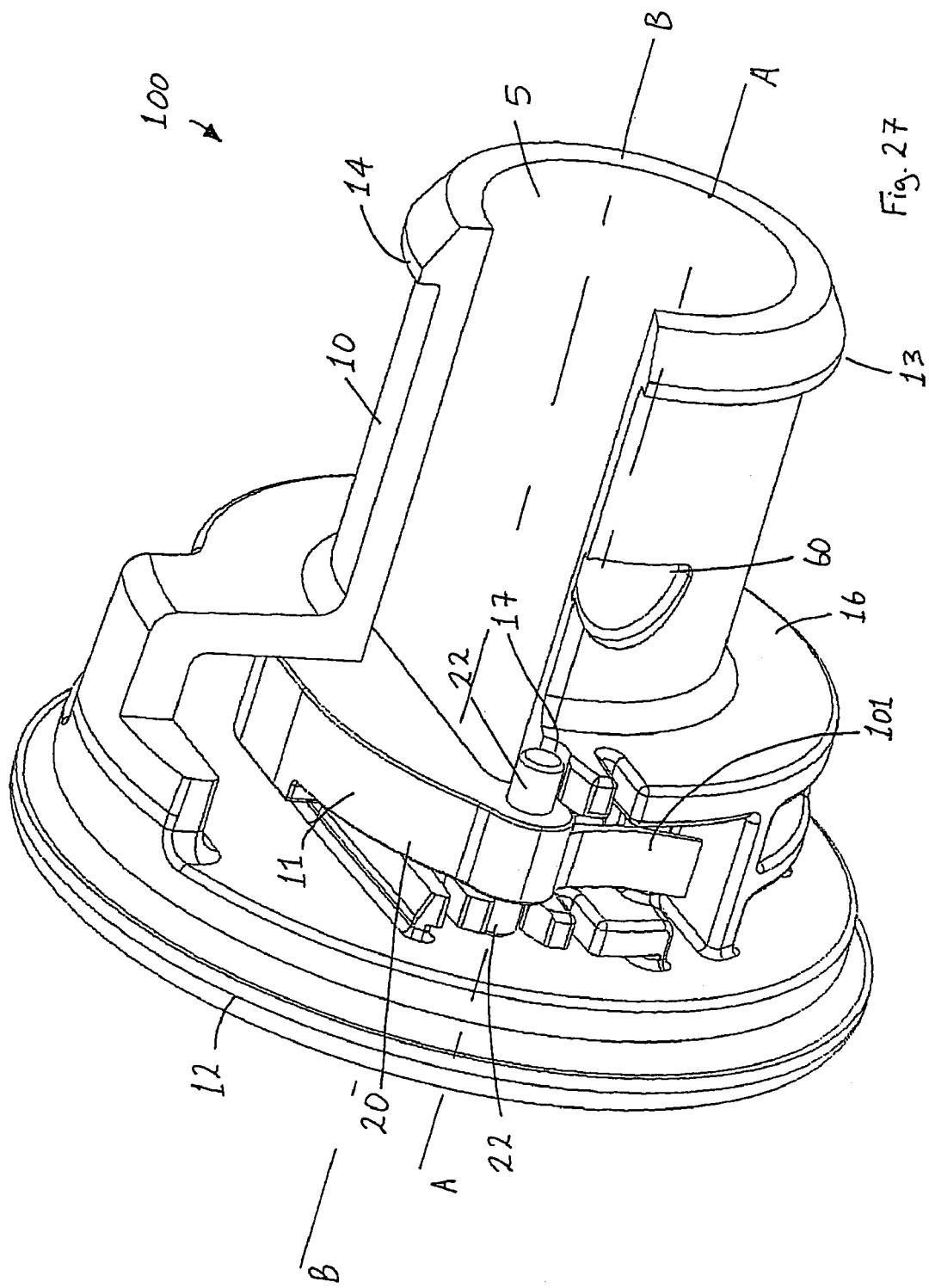
FIGS. 27 to 32 are views similar to FIGS. 6, 7, and 17 to 20 respectively of another journal according to the invention.
Figure 28:
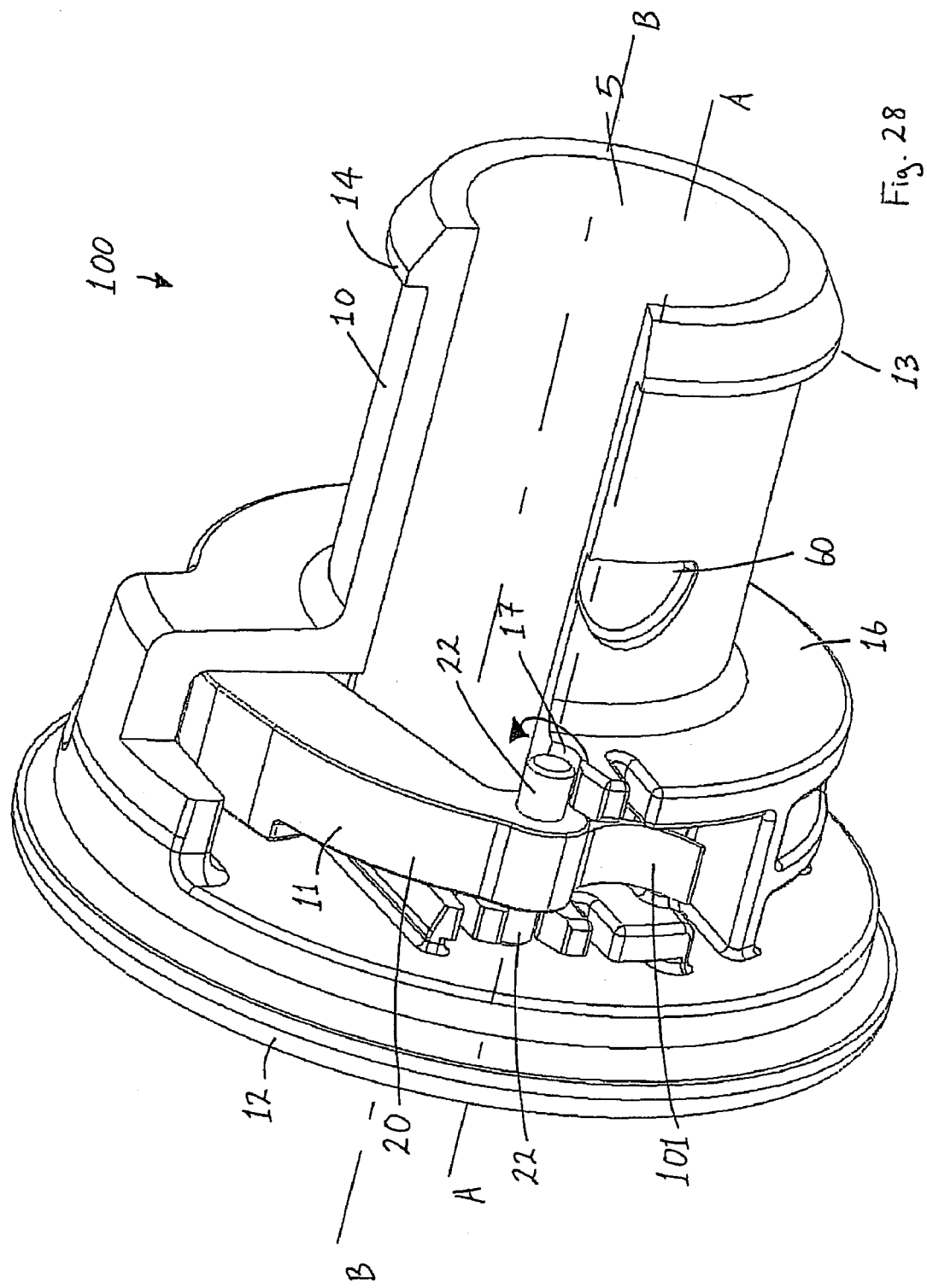

If it is desired to remove the axle 3 from the journal 1, for example to facilitate replacement of the wheel 2, a simple pointed tool, such as a flat blade screwdriver, may be used to pierce the thin layer of plastic covering the accessway 15, and then may be inserted through the accessway 15 into the engagement recess 23. The locking arm 20 is then levered up out of the axle groove 8 from the secured position to the release position to enable to axle 3 to be withdrawn from the reception space 5 of the journal 1 (FIGS. 25 and 26).

By forming the journal 1 from the separate components of the main body portion 10 and the locking element 11, this results in a simple journal 1 which is relatively easy to manufacture. In addition the locking element 11 may conveniently be mounted to the separate main body portion 10 in a simple snap-fit arrangement.

The invention provides a wheel with an axle retaining system that is of relatively simple construction. The retaining system is easy to assemble to and from an axle.

Referring to FIGS. 27 to 32 there is illustrated another journal 100 according to the invention, which is similar to the journal 1 of FIGS. 1 to 26, and similar elements in FIGS. 27 to 32 are assigned the same reference numerals.

In this case, the actuating arm of the locking element 11 is provided in the form of a resilient leaf spring 101 of a plastics material. The leaf spring 101 and the locking arm 20 are formed integrally to form the locking element 11. In this case, the leaf spring 101 is provided in the form of a substantially planar element. When the locking element 11 is in the release position (FIG. 28), the leaf spring 101 bears directly against an upstanding shoulder on the main body portion 10 and acts as a biasing element to bias the locking arm 20 towards the secured position. In particular the coiled spring and the spigot are not required with the journal 100.

Figure 29:
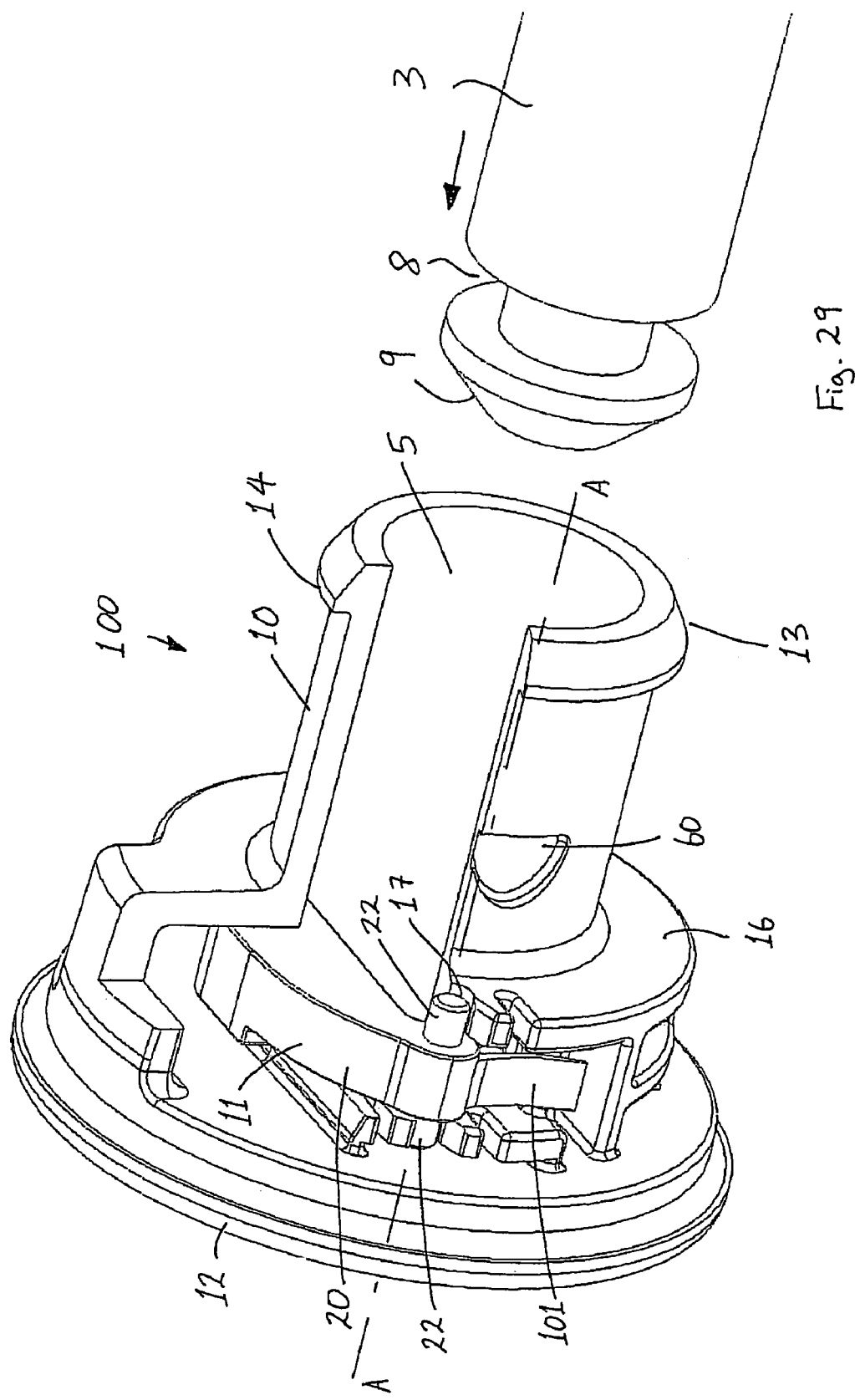
Figure 30:
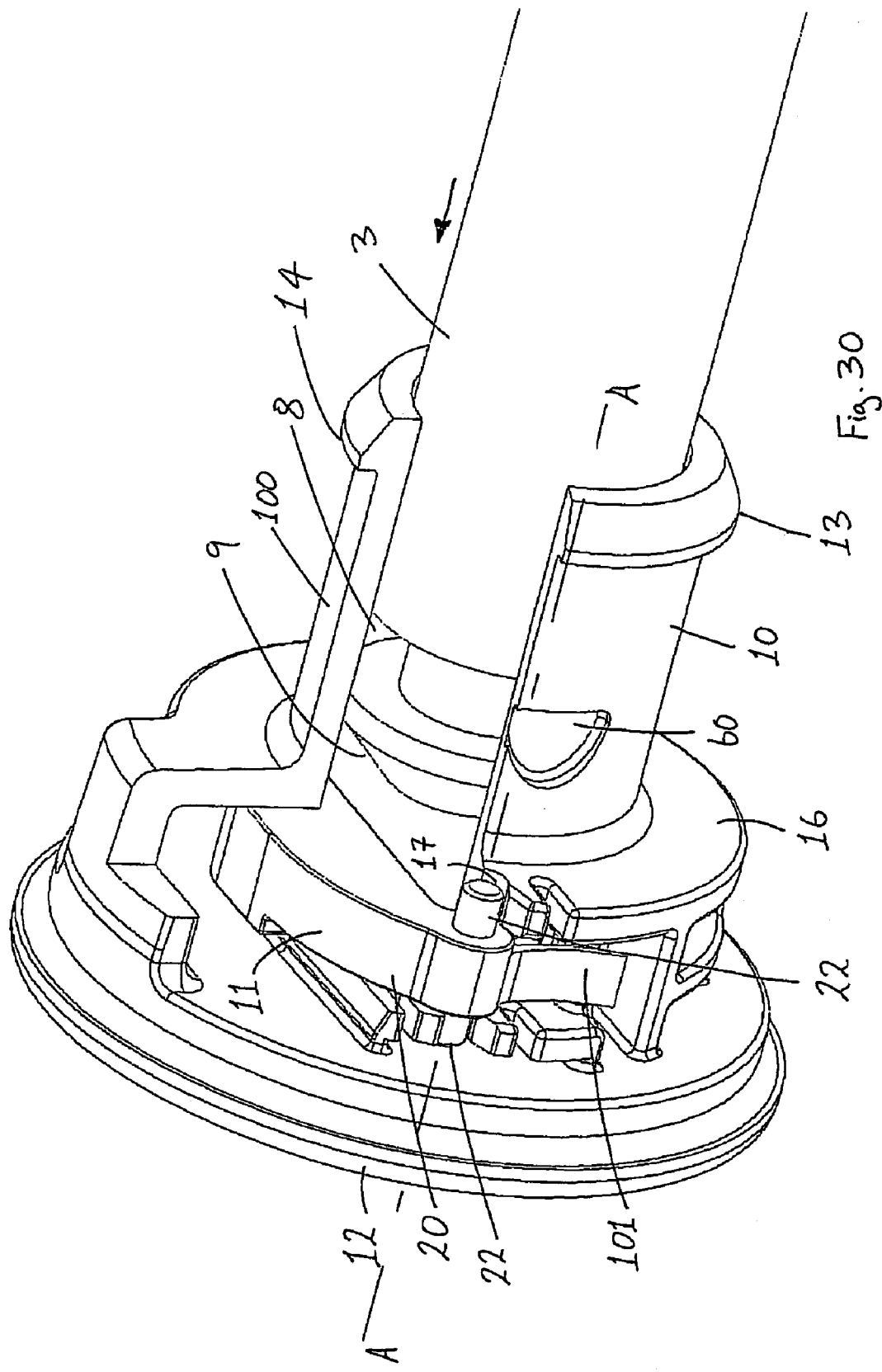
Figure 31:
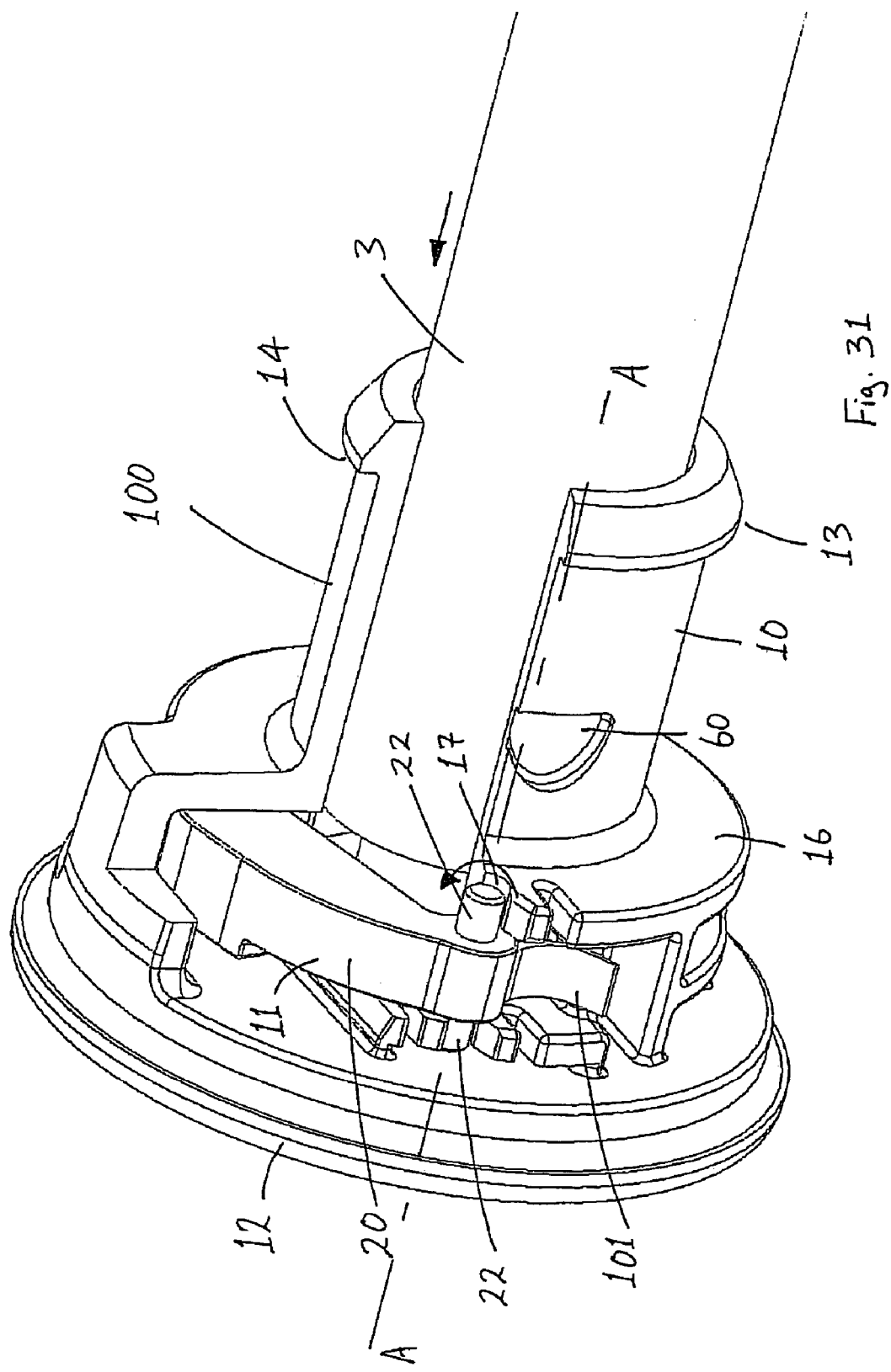

To couple the axle 3 to the journal 100, the leading end 9 of the axle 3 is inserted into the reception space 5 (FIGS. 29 and 30). As the leading end 9 passes the locking element 11, the locking arm 20 is pivoted from the secured position to the release position by a camming engagement of the chamfered leading end 9 with the locking arm 20 (FIG. 31). This pivoting of the locking element 11 causes the leaf spring 101 to flex.

Figure 32:
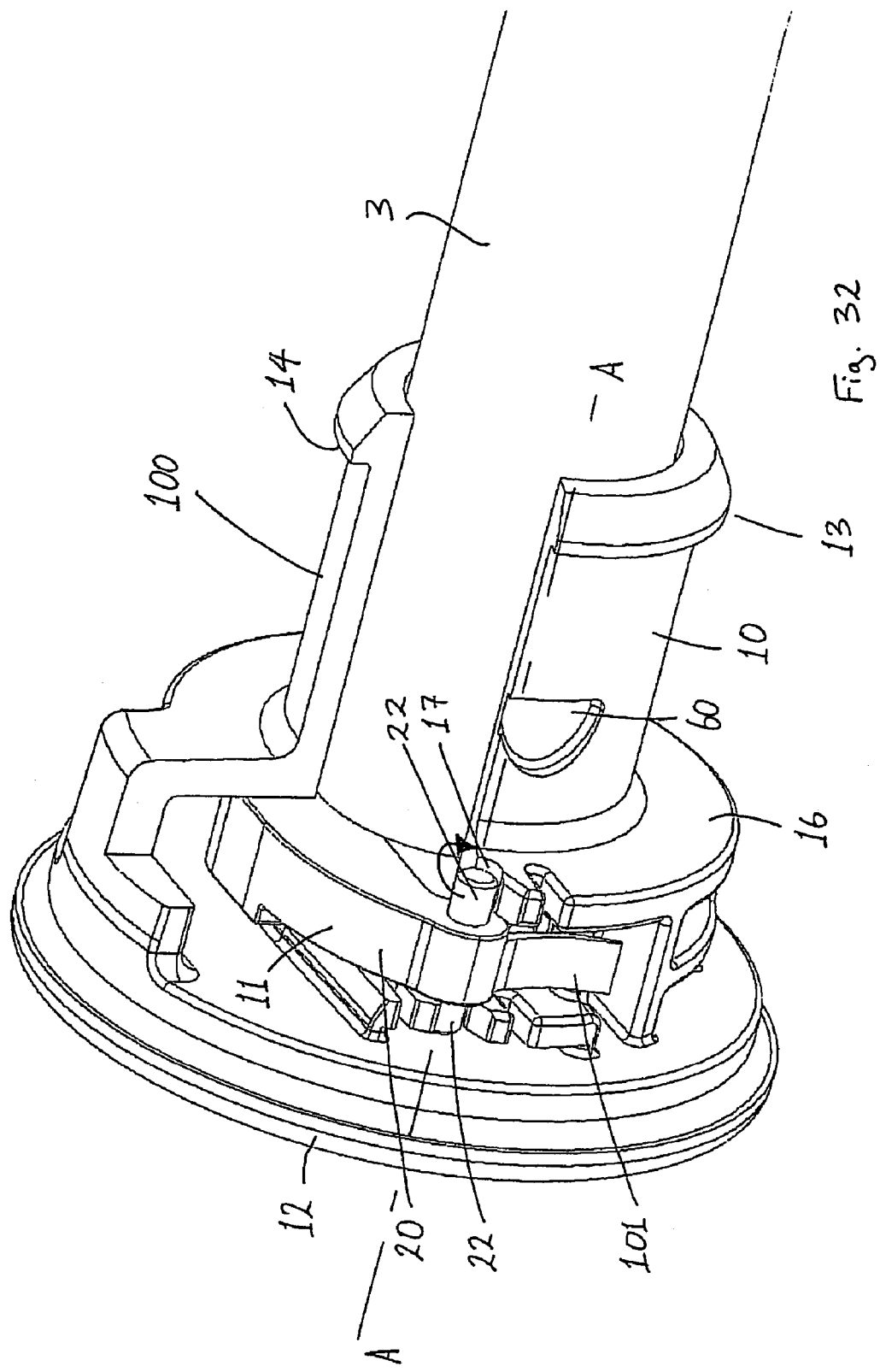

When the leading end 9 reaches the cap 12, the axle groove 8 is aligned with the locking element 11. Under the biasing action of the leaf spring 101, the locking arm 20 is pivoted from the release position to the secured position (FIG. 32). The axle 3 is thus secured in position within the reception space 5 of the journal 100.

The use of the leaf spring 101, which is integrally formed with the locking arm 20, results in a simpler locking element 11 which is easier and cheaper to produce and to assemble. In particular, when assembling the journal 100, it is not necessary to mount a coiled spring to a corresponding spigot which can be an intricate and difficult task. Thus the time and costs involved in assembling the journal 100 are minimised.

Figure 33:
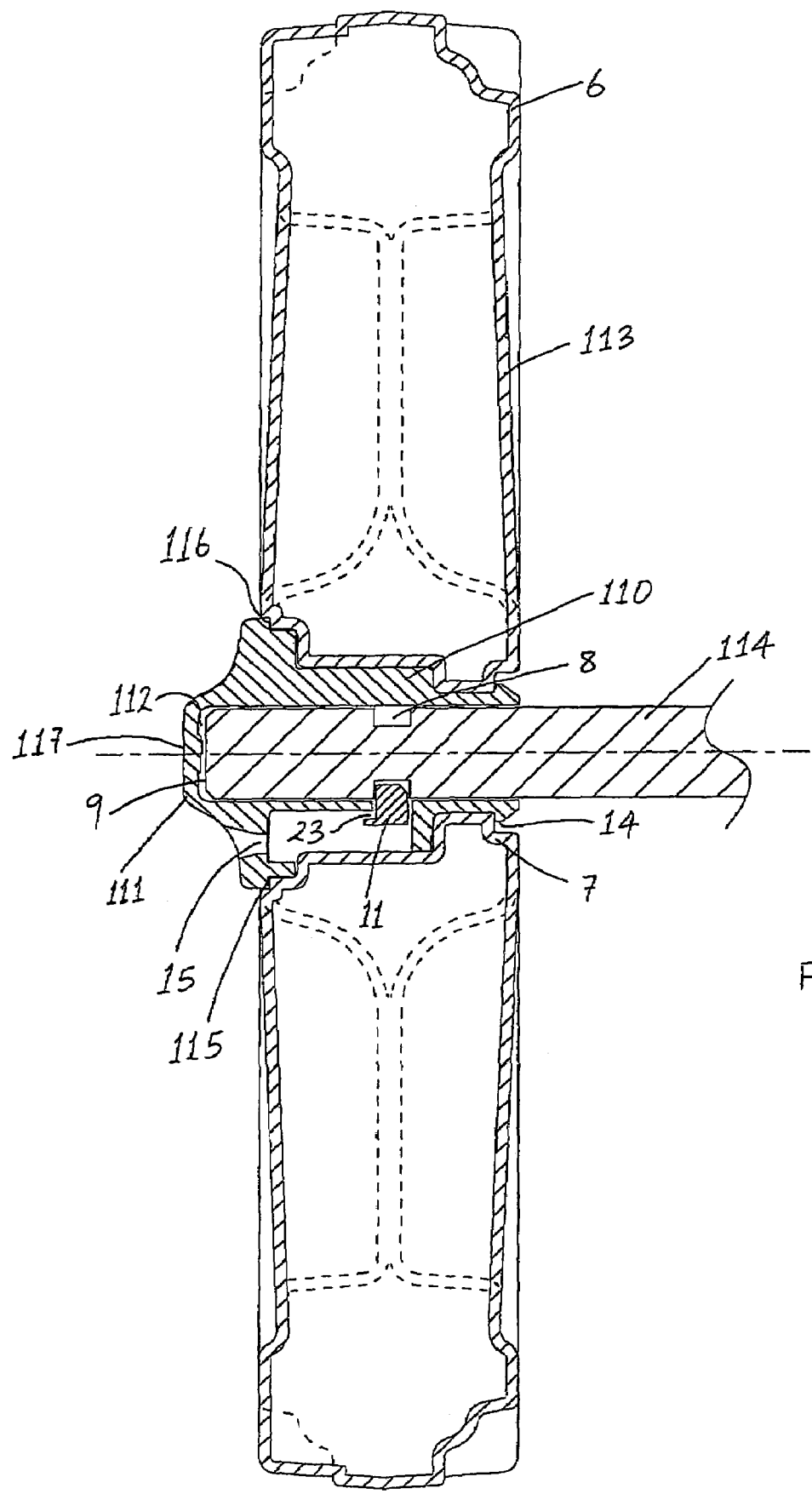
FIGS. 33 and 34 are views similar to FIGS. 23 and 24 of an axle secured in position in another journal according to the invention which is mounted in a bore of another wheel according to the invention.
Figure 34:
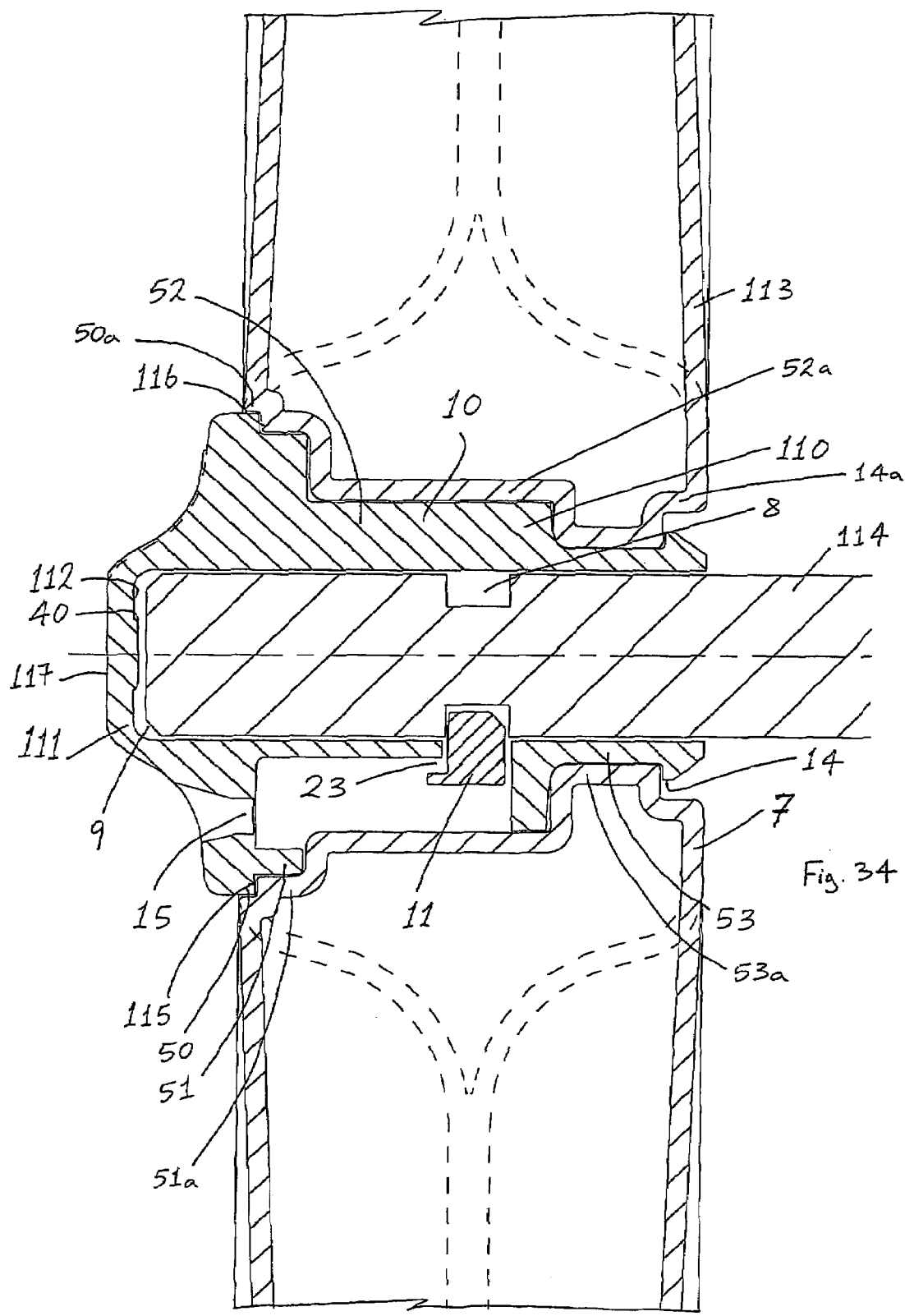

In FIGS. 33 and 34 there is illustrated a further journal 110 according to the invention, which is similar to the journal 1 of FIGS. 1 to 26, and similar elements in FIGS. 33 and 34 are assigned the same numerals.

In this case, the outer cap 111 at the closed end 112 of the reception space 5 is substantially frusto-conically shaped.

A base 115 of the frusto-cone cap 111 engages a shoulder 116 defined on the wheel 113 to retain the journal 110 in position in the bore 4, and an apex 117 of the frusto-cone cap 111 extends from the base 115 externally of the bore 4.

In this manner, the closed end 112 of the reception space 5 is located externally of the bore 4 of the wheel 113, when the journal 110 is mounted in the bore 4.

When the axle 114 is fully inserted into the reception space 5, the leading end 9 of the axle 114 will also be located externally of the bore 4 (FIG. 34). This arrangement enables the axle 114 to be inserted a sufficient distance through the bore 4, such that the locking element 11 will engage the groove 8 at a region of engagement substantially mid-way along the length of the bore 4, as illustrated in FIGS. 33 and 34. Thus the area of the bearing surface between the journal 110 and axle 114 on one side of the groove 8 is substantially equal to the area of the bearing surface on the other side of the groove 8. The axle 114 will therefore support the wheel load in a more evenly balanced manner.

Moving from the closed end 112 to the insertion end 13, the main body portion 10 comprises the outer cap 111, the first portion 50, the second portion 51, the third portion 52, a fourth portion 53 and the lip 14. The fourth portion 53 has a smaller outer diameter than the third portion 52, and a smaller outer diameter than the lip 14. In this case, the second portion 51 has a smaller diameter than the first portion 50 around the full circumference of the journal 1.

Similarly the bore 4 comprises the first portion 50a, the second portion 51a, the third portion 52a, a fourth portion 53a, and the lip portion 14a. The fourth portion 53a has a smaller inner diameter than the third portion 52a, and a smaller inner diameter than the lip portion 14a. In this case the second portion 51a has a smaller inner diameter than the first portion 50a around the full circumference of the bore 4.

Figure 35:
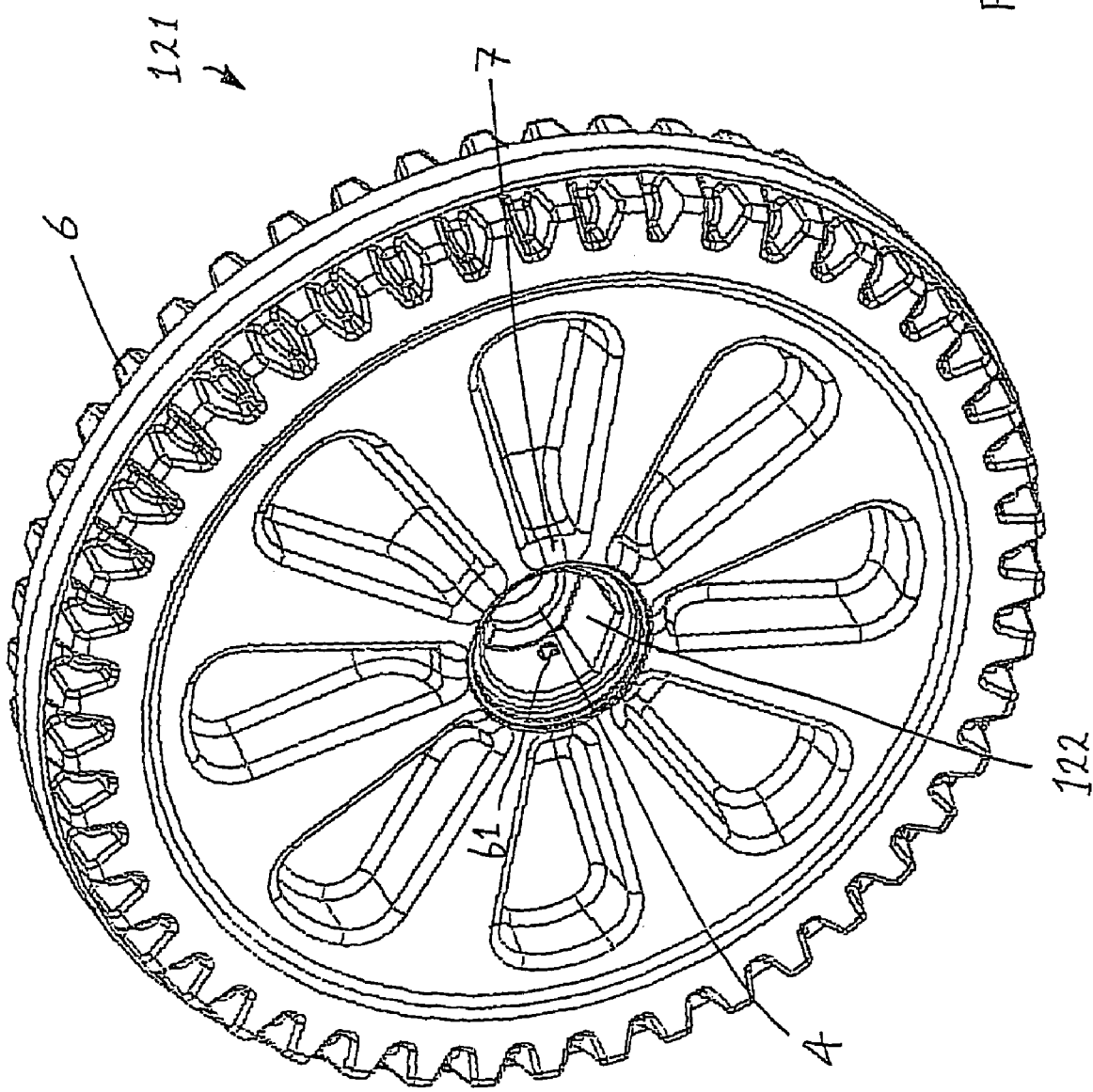
FIG. 35 is a perspective view of another wheel according to the invention.
Figure 36:
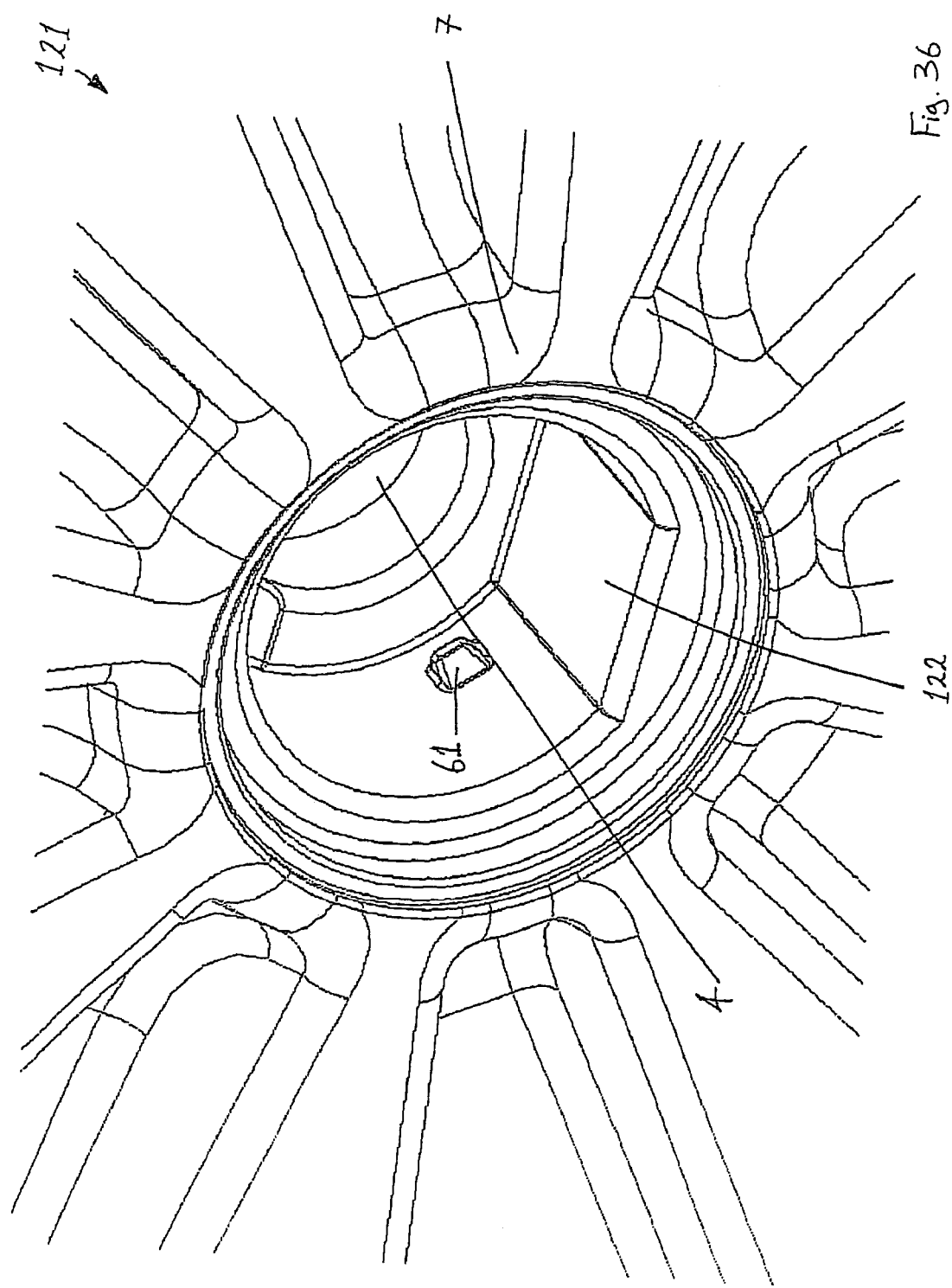
FIG. 36 is an enlarged, perspective view of a bore of the wheel of FIG. 35.
Figure 37:
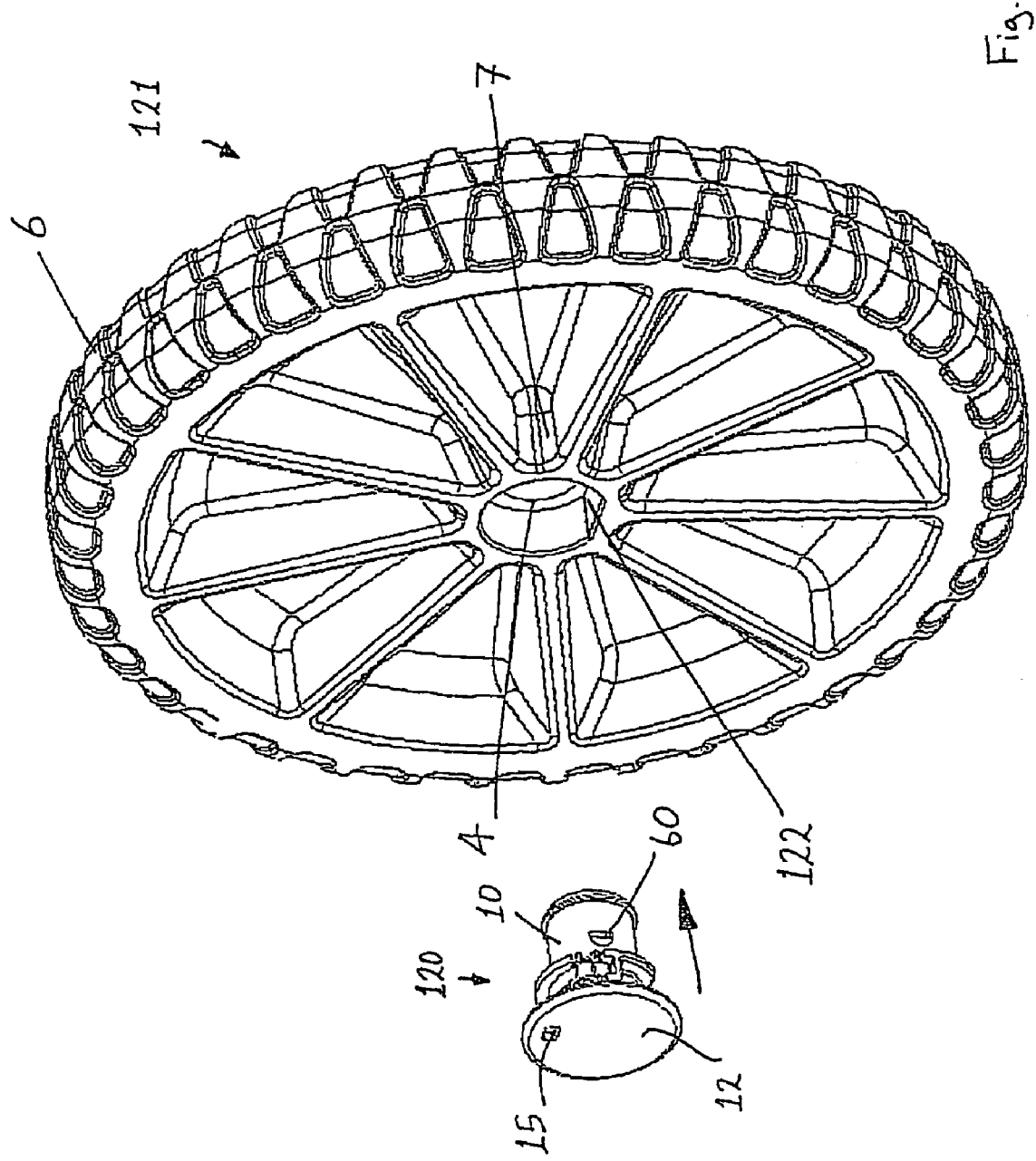
FIG. 37 is a perspective view illustrating mounting of another journal according to the invention in the bore of FIG. 36.

FIGS. 35 to 37 illustrate another journal 120 according to the invention and another wheel 121 according to the invention.

In this case a part of the main body portion 10 of the journal 120 has a substantially flat shape and a corresponding part 122 of the bore 4 of the wheel 121 has a substantially flat shape. The flattened part of the main body portion 10 extends around only a portion of the circumference of the main body portion 10, and the flattened part 122 of the bore 4 extends around only a portion of the circumference of the bore 4. The flattened part of the main body portion 10 is mated with the flattened part 122 of the bore 4 when mounting the journal 120 in the bore 4. In this manner the flattened parts assist in circumferential alignment of the journal 120 relative to the bore 4 during mounting in the bore 4. The user can therefore quickly and easily mount the journal 120 in the bore 4 in the correct circumferential position relative to the bore 4.

It will be appreciated that the means to align the journal relative to the bore 4 when mounting in the bore 4 may be provided in any suitable form. For example, a male tooth element may be provided protruding from the main body portion 10 of the journal, and the wheel may include a corresponding female recess suitable for receiving the male tooth element. In this manner the corresponding tooth and recess arrangement assists in circumferential alignment of the journal relative to the bore 4 during mounting in the bore 4.

The invention is not limited to the embodiments hereinbefore described, with reference to the accompanying drawings, which may be varied in construction and detail.

The invention claimed is:

1. A journal for coupling a wheel to an axle; the journal being configured to be mounted in a bore of a wheel; the journal defining a reception space for receiving at least part of an axle; the journal comprising:
   a main body portion;
   a locking element separate from the main body portion, the locking element being movable between a release position in which the axle is removable from the reception space and a secured position in which the axle is secured in position in the reception space; and
   a biasing element to bias the locking element towards the secured position;
   the biasing element being provided integral with the locking element,
   the biasing element comprises a resilient element configured to bear against the main body portion to bias the locking element towards the secured position, and the main body portion includes an upstanding shoulder against which the resilient element is configured to bear to bias the locking element towards the secured position.

2. The journal as claimed in claim 1 wherein the biasing element is of a plastics material.

3. The journal as claimed in claim 1, wherein the resilient element comprises a leaf spring.

4. The journal as claimed in claim 1, wherein the resilient element is provided in the form of a substantially planar element.

5. The journal as claimed in claim 4 wherein the planar element comprises a tab.

6. The journal as claimed in claim 1 wherein the locking element is pivotable about a pivot axis between the release position and the secured position.

7. The journal as claimed in claim 6 wherein the pivot axis is substantially parallel to a longitudinal axis of the reception space.

8. The journal as claimed in claim 7 wherein the pivot axis is radially offset from the longitudinal axis of the reception space.

9. The journal as claimed in claim 6 wherein the pivot axis extends through the region of the junction between the biasing element and the locking element.

10. The journal as claimed in claim 1 wherein the locking element is mounted to the main body portion.

11. The journal as claimed in claim 10 wherein the locking element comprises a pivot extension for location in a co-operating pivot receiver of the main body portion.

12. The journal as claimed in claim 1, wherein the locking element is shaped to resist movement of the locking element from the secured position to the release position upon retraction of an axle through the reception space.

13. The journal as claimed in claim 1 wherein the journal comprises an accessway through which access may be gained to one or more movable parts of the journal.

14. The journal as claimed in claim 13 wherein the accessway is provided in the main body portion through which access may be gained to the locking element.

15. The journal as claimed in claim 1 wherein the locking element comprises an engagement formation to facilitate movement of the locking element between the secured position and the release position.

16. The journal as claimed in claim 15 wherein the engagement formation comprises a recess.

17. A journal for coupling a wheel to an axle; the journal being configured to be mounted in a bore of a wheel; the journal defining a reception space for receiving at least part of an axle; the journal comprising
   a locking element movable between a release position in which the axle is removable from the reception space, and a secured position in which the locking element is engagable with the axle at a region of engagement to secure the axle in position in the reception space;
   the region of engagement being located substantially midway along the length of the bore, when the journal is mounted in the bores,
   the reception space defining an insertion end through which the axle may enter the reception space, and a closed end opposite to the insertion end;
   the closed end of the reception space being configured for location externally of the bore, when at least part of the journal is mounted in the bore, to facilitate reception of the axle in the reception space with a leading end of the axle located externally of the bore.

18. A journal for coupling a wheel to an axle:
   the journal being configured to be mounted to a wheel with at least part of the journal in a bore of the wheel;
   the journal defining a reception space for receiving at least part of an axle;
   the reception space defining an insertion end through which the axle may enter the reception space, and a closed end opposite to the insertion end;
   the closed end of the reception space being configured for location externally of the bore, when at least part of the journal is mounted in the bore, to facilitate reception of the axle in the reception space with a leading end of the axle located externally of the bore;
   the journal comprising a locking element movable between a release position in which the axle is removable from the reception space, and a secured position in which the locking element is engagable with the axle at a region of engagement within the bore to secure the axle in position in the reception space.

19. The journal as claimed in claim 18 wherein at least part of the journal is substantially frusto-conically shaped at the closed end.

20. The journal as claimed in claim 19 wherein a base region of the frusto-cone is engagable with a shoulder defined on the wheel to retain the journal in position in the bore.

21. The journal as claimed in claim 20 wherein an apex region of the frusto-cone extends from the base region externally of the bore, when at least part of the journal is mounted in the bore.

22. The journal as claimed in claim 18 wherein the locking element is configured to engage with the axle in a recess in the axle.

* * * * *

UNITED STATES PATENT AND TRADEMARK OFFICE
CERTIFICATE OF CORRECTION

PATENT NO. : 7,591,592 B2 Page 1 of 1
APPLICATION NO. : 11/186862
DATED : September 22, 2009
INVENTOR(S) : Beirne et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 833 days.

Signed and Sealed this

Twenty-first Day of September, 2010

David J. Kappos
*Director of the United States Patent and Trademark Office*